US012064393B2

(12) United States Patent
Shah

(10) Patent No.: US 12,064,393 B2
(45) **Date of Patent: *Aug. 20, 2024**

(54) DEVICE, SYSTEMS, AND METHODS FOR PREVENTION OF DEEP VEIN THROMBOSIS

(71) Applicant: Bhavya Ramesh Shah, Irving, TX (US)

(72) Inventor: Bhavya Ramesh Shah, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,183

(22) Filed: Sep. 1, 2021

(65) Prior Publication Data

US 2022/0160575 A1 May 26, 2022

Related U.S. Application Data

(63) Continuation of application No. 16/048,913, filed on Jul. 30, 2018, now Pat. No. 11,135,128.

(60) Provisional application No. 62/541,784, filed on Aug. 7, 2017.

(51) Int. Cl.
*A61H 9/00* (2006.01)
*A61H 1/00* (2006.01)
(Continued)

(52) U.S. Cl.
CPC ............ *A61H 9/0092* (2013.01); *A61H 1/00* (2013.01); *A61H 9/00* (2013.01); *A61H 9/0007* (2013.01);
(Continued)

(58) Field of Classification Search
CPC .......... A61H 1/00; A61H 9/0092; A61H 9/00; A61H 9/0007; A61H 9/0078; A61H 11/00;
(Continued)

(56) References Cited

U.S. PATENT DOCUMENTS 3,286,711 A * 11/1966 MacLeod ........... A61B 17/1355 4/535
3,292,613 A * 12/1966 MacLeod ........... A61B 17/1355 601/9
(Continued)

FOREIGN PATENT DOCUMENTS

CN 1536981 A 10/2004
JP 2000093474 A 4/2000
(Continued)

OTHER PUBLICATIONS

EP18844929.2 Extended European Search Report dated Apr. 6, 2021.
(Continued)

*Primary Examiner* — Tu A Vo
(74) *Attorney, Agent, or Firm* — Wilson Sonsini Goodrich & Rosati

(57) ABSTRACT

Embodiments provide devices, systems and methods for preventing deep vein (DV) thrombosis (DVT). One embodiment provides a DVT prevention device including a cuff that fits over a patient's knee, an applanator coupled to an inside cuff surface, an expandable member (EM) coupled to the applanator, a pressure source fluidically coupled to the EM and a controller for controlling EM inflation. When the EM is inflated, it applies a force to the applanator which is transmitted to the knee back surface causing a popliteal vein (PV) under the cuff to be compressed so as to increase backpressure behind the compressed PV and subsequently increase the velocity of blood flow in the leg DVs when the EM is deflated. The EM can be inflated in a cycle including pulsed inflation, inflation hold and relaxation. The cycles can be repeated and adjusted to achieve a desired increase of blood flow/velocity in leg DVs.

33 Claims, 9 Drawing Sheets

(51) Int. Cl.
*A61H 11/00* (2006.01)
*A61H 23/00* (2006.01)
*A61H 23/02* (2006.01)

(52) U.S. Cl.
CPC ........... *A61H 9/0078* (2013.01); *A61H 11/00* (2013.01); *A61H 23/02* (2013.01); *A61H 2201/0103* (2013.01); *A61H 2201/0119* (2013.01); *A61H 2201/0157* (2013.01); *A61H 2201/0169* (2013.01); *A61H 2201/1215* (2013.01); *A61H 2201/1238* (2013.01); *A61H 2201/164* (2013.01); *A61H 2201/165* (2013.01); *A61H 2201/169* (2013.01); *A61H 2201/50* (2013.01); *A61H 2201/5025* (2013.01); *A61H 2201/5028* (2013.01); *A61H 2201/5043* (2013.01); *A61H 2201/5046* (2013.01); *A61H 2201/5048* (2013.01); *A61H 2201/5051* (2013.01); *A61H 2201/5056* (2013.01); *A61H 2201/5071* (2013.01); *A61H 2201/5097* (2013.01); *A61H 2205/06* (2013.01); *A61H 2205/102* (2013.01); *A61H 2209/00* (2013.01)

(58) Field of Classification Search
CPC ............ A61H 23/02; A61H 2201/0103; A61H 2201/0119; A61H 2201/0157; A61H 2201/0169; A61H 2201/1215; A61H 2201/1238; A61H 2201/164; A61H 2201/165; A61H 2201/169; A61H 2201/50; A61H 2201/5025; A61H 2201/5028; A61H 2201/5043; A61H 1/008; A61H 2201/5046; A61H 2201/5048; A61H 2201/5051; A61H 2201/5056; A61H 2201/5071; A61H 2201/5097; A61H 2205/06; A61H 2205/102; A61H 2209/00
See application file for complete search history.

(56) References Cited

U.S. PATENT DOCUMENTS

| | | | | | |
|---|---|---|---|---|---|
| 4,215,679 | A | 8/1980 | Rustin | | |
| 4,269,175 | A | 5/1981 | Dillon | | |
| 4,624,244 | A * | 11/1986 | Taheri | A61H 9/0078 | 601/152 |
| 5,458,562 | A * | 10/1995 | Cooper | A61H 9/005 | 601/151 |
| 7,207,959 | B1 | 4/2007 | Chandran | | |
| 7,618,384 | B2 | 11/2009 | Nardi et al. | | |
| 9,205,019 | B2 | 12/2015 | Ganske et al. | | |
| 11,135,128 | B2 * | 10/2021 | Shah | A61H 9/0078 | |
| 2005/0197523 | A1 | 9/2005 | Chung et al. | | |
| 2006/0116615 | A1 | 6/2006 | Zheng et al. | | |
| 2008/0071202 | A1 * | 3/2008 | Nardi | A61H 11/00 | 601/97 |
| 2008/0103397 | A1 | 5/2008 | Barak et al. | | |
| 2009/0326576 | A1 | 12/2009 | Ben-Nun | | |
| 2010/0268130 | A1 * | 10/2010 | Khan | A61H 9/0078 | 601/150 |
| 2011/0125036 | A1 | 5/2011 | Nakajima et al. | | |
| 2011/0152734 | A1 * | 6/2011 | Zamboni | A61H 9/0078 | 601/134 |
| 2012/0089063 | A1 * | 4/2012 | Olson | A61H 9/0078 | 601/152 |
| 2013/0018291 | A1 * | 1/2013 | Kraal | A61H 9/0078 | 601/149 |
| 2016/0120445 | A1 | 5/2016 | Peluso et al. | | |
| 2017/0100301 | A1 * | 4/2017 | Denson | A61F 5/0585 | |
| 2018/0229064 | A1 | 8/2018 | Tagami | | |

FOREIGN PATENT DOCUMENTS

| | | | |
|---|---|---|---|
| JP | 2008114048 | A | 5/2008 |
| JP | 2013063115 | A | 4/2013 |
| JP | 2014516743 | A | 7/2014 |
| WO | WO-9718788 | A1 | 5/1997 |
| WO | WO-2012174276 | A2 | 12/2012 |
| WO | WO-2019032325 | A1 | 2/2019 |

OTHER PUBLICATIONS

Office action dated Nov. 13, 2020 for U.S. Appl. No. 16/048,913.
PCT/US2018/044368 International Search Report and written opinion dated Nov. 19, 2018.
U.S. Appl. No. 16/048,913 Notice of Allowance dated Jun. 2, 2021.
U.S. Appl. No. 16/048,913 Notice of Allowance dated Aug. 30, 2021.
U.S. Appl. No. 16/048,913 Notice of Allowance dated Jul. 21, 2021.
U.S. Appl. No. 16/048,913 Notice of Allowance dated Jun. 9, 2021.

* cited by examiner

DEVICE, SYSTEMS, AND METHODS FOR PREVENTION OF DEEP VEIN THROMBOSIS

CROSS-REFERENCE TO RELATED APPLICATIONS

This application is a continuation of U.S. patent application Ser. No. 16/048,913, filed Jul. 30, 2018, which claims the benefit of priority to U.S. Provisional Application No. 62/541,784, filed Aug. 7, 2017, the entire content of which is fully incorporated herein.

BACKGROUND OF THE INVENTION

1. Field of the Invention

Embodiments described herein relate to the prevention of thrombosis in the vascular system. More specifically, embodiments of the invention relate to the devices systems and methods for the prevention of thrombosis in the venous system. Still more specifically, embodiments of the invention relate to devices, systems and methods for the prevention of deep vein thrombosis including in the legs and arms.

Deep Venous Thrombosis (DVT) is the formation of a thrombus (blood clot) within the deep veins of the body. Typically, DVTs are encountered in the lower extremities, although they may form in any venous structure. Clinically, DVTs result in localized thrombophlebitis or pain, swelling, erythema, and warmth. When a DVT embolizes into the pulmonary arterial circulation, it results in a pulmonary embolism. Pulmonary embolism is the most dangerous complication of a DVT and can result in lung infarction, heart failure, and sudden death. Physiologically, DVTs result from a constellation of conditions that result in what's known as Virchow's triad. Virchow's triad can be summarized as venous stasis, vessel wall injury, or hypercoagulability. The CDC estimates that DVTs occur in 200,000-600,000 people every year and result in 60,000-100,000 deaths from pulmonary emboli annually. Pulmonary Embolism has been cited as the most common yet preventable cause of death. The Surgeon General's Executive Report and CDC reports that the incidence and prevalence of DVT continues to increase, citing rates of 1-2 per 1000 patients, with rates as high as 1 per 100 in the high risk population. The Centers for Medicare and Medicaid in conjunction with the "Surgeon Generals Call to Action To Prevent DVTs and Pulmonary Embolism," have deemed DVTs and Pulmonary Embolism as "never events," and have refused to pay for an extended hospitalization occurring from DVT or Pulmonary Embolism.

The approach to the present management of DVT and Pulmonary Embolism can be summarized into three steps: prevention, diagnosis, and treatment. Prevention strategies can be divided into anti-coagulant medications and devices that attempt to recirculate venous blood. DVTs are diagnosed using duplex ultrasound. The ultrasound technician evaluates each vein for compressibility and patency and then sends the images to a radiologist for interpretation. A large majority of DVT's are never diagnosed because they occur outside of the hospital, either at home or in a nursing home. Therapeutic options for patients diagnosed with DVT include catheter directed thrombolysis, anticoagulation to prevent formation of a secondary clot, and if the patient cannot be anti-coagulated, IVC filter placement to prevent pulmonary embolism (PE). In addition, a variety of prevention measures are instituted to reduce the relatively high risk of a secondary DVT formation.

Although anti-coagulant medication has been shown to reduce the risk of DVT/PE, these medications come with an increased risk of bleeding. The bleeding risk increases significantly when these medications are used in high risk DVT patients, as these patients are usually elderly patients, post-surgical patients, and cancer patients. Devices that attempt to recirculate venous blood are understood to work by increasing the velocity of blood within the common femoral vein and thereby preventing venous stasis.

Currently available devices that re-circulate venous blood include sequential compression devices (SCDs) and compression stockings. However, both of the devices have significant shortcomings. In particular SCDs require a large battery sources and exert external pressure on ankle, calf, or thigh veins. Typically, SCDs work on the tibial and peroneal calf veins. The tibial and peroneal veins are surrounded by two large muscles, the soleus and gastrocnemius muscles. In a healthy individual, upon ambulation these large muscles squeeze the calf veins and promote venous return of blood. One-way venous valves in these patients ensure that the venous blood flows against gravity and prevents reflux or pooling of blood. In patients that are immobile or bed ridden the SCDs attempt to replicate this mechanism externally. To exert a force large enough to compress the calf veins and promote venous blood flow, the SCDs have to work against the muscles of the calf, this results in very large pressure application to the lower extremities which is not desirable. In particular, this high pressure consequently damages the venous valves and increases the incidence of DVT/PE in the future. To exert large pressures to prevent the formation of a DVT these large bulky devices usually incorporate a large battery back and a pressure generating mechanism. This bulky structure makes ambulation for the patient challenging and contributes to venous stasis, one of the elements in Virchow's triad which promotes the formation of a DVT.

Compression stockings are another approach to promote venous return of blood. However, they are difficult to use and as a result have a poor compliance rate. Furthermore, research has shown that compression stockings do not obtain a sufficient level of compression to prevent DVTs/PEs.

Thus, owing to the many shortcomings of the current state of the art for DVT prevention, there is a need for improved devices and methods for the prevention of deep vein thrombosis and associated conditions such as pulmonary embolisms.

BRIEF DESCRIPTION OF THE INVENTION

Various embodiments of the invention provide devices, systems and methods for the prevention of deep vein thrombosis (DVT) in the appendages such as the arms and the legs. Many embodiments provide devices, systems and methods for prevention of deep vein thrombosis in the veins of the leg including, for example, the femoral, popliteal and tibial veins.

Particular embodiments of the DVT prevention device provide a cuff-like device which fits over the leg of the patient and includes an applanator which applies a force to the surface of the leg to flatten or otherwise compress the deep veins in the leg, including the popliteal vein such that blood flow through the leg deep veins is substantially occluded. The force is then released and blood flow resumes. The force is typically generated using an inflatable balloon attached to the applanator though other inflation devices are also contemplated. In preferred embodiments, the cuff is configured to fit over the knee and the applanator is positioned on the cuff so as to apply force to the back of the knee sufficient to compress one or more of the distal common femoral vein, popliteal vein, posterior tibial vein, anterior tibial vein, and peroneal vein. Notably, over 90% of DVTs occur in this area. However, it should be appreciated that embodiments of the cuff can be adapted to fit over any portion of the leg such as the calf or upper thigh as well as the arm. It should also be appreciated that while various embodiments refer to the popliteal vein as the vein which is compressed by the applanator/DVT prevention device, various embodiments of the invention contemplate the compression of any vein including any deep vein in the arms or legs as well as superficial veins in the same or different locations.

In many embodiments of the invention, the force from the applanator is applied according to a pressure/inflation cycle also known as a compression regimen. Typically, the compression regimen comprises a pattern of internment force pulses (also described herein as compressive pulses or pressure pulses) which results in increased blood flow through the compressed vein for an extended period after the regimen is completed. In particular embodiments, including those where the cuff is positioned over the knee, the compression regimen can be configured to produce direct, intermittent compression and relaxation of the popliteal or other deep vein in the region of the knee. This causes periodic opening and closing of the popliteal vein which in turn, results in increased venous circulation, common femoral vein velocity, and also indirectly drains the veins of the lower leg.

The compression regimen can be repeated multiple times over selected time periods resulting in prolonged (e.g., about 5 to 60 minutes) increases in venous blood flow and velocity through the compressed area of tissue including the compressed deep vein. Using such a regimen, average blood velocity/flow in one more or compressed deep veins can be increased over 100, 200, 300, 400 or even over 500% for extended periods of time. Particular embodiments of the device using such a regimen have demonstrated between a 387% to 506% average increase in blood velocity/flow in deep veins such as the common femoral vein. As a result of such increases, blood flow through the affected vein the risk of thrombosis formation is substantially reduced. Embodiments of the invention are useful for preventing DVT in patients who are bed ridden or who have poor circulation, in particular poor venous circulation. Further, embodiments of the invention are especially useful for preventing DVTs in the deep veins of the leg such as the femoral and popliteal veins in patients who are hospitalized or otherwise bed ridden for any length of time as well as patients who are wheel chair bound or otherwise immobilized or in a sitting position for any length of time such as those patients on prolonged airline flights.

Embodiments of the DVT prevention device and associated methods of using the device, reduce a patient's risk of developing a deep venous thrombosis (DVT) by significantly improving the flow rate and efficiency of peripheral and central venous return. The reasons behind this risk reduction are as follows. Blood stasis and venous blood pooling are a well-known risk factor for the formation of a DVT. There are numerous conditions that can result in temporary or permanent immobility and predispose patients to developing venous stasis, and subsequently the formation of a DVT or pulmonary embolism (PE) and/or other pulmonary embolic event (PEE). Whereas arteries have muscular walls that can constrict and promote circulation of blood, veins have a very thin muscular layer and by themselves, are less able to promote recirculation of blood. Veins, however, do contain one-way venous valves which promotes unidirectional venous blood return to the heart. Venous valves are critical components in the body's ability to recirculate blood flow against gravity. Recent studies have accurately depicted the anatomic locations of venous valves. Venous valves are most prevalent within the veins of the calf and veins of the upper thigh. The deep veins of the calf and the deep veins of the thigh are surrounded by large thigh and calf muscles, these muscles that encase these veins provide an additional mechanism of venous return. Muscle contraction during ambulation results in a circumferential force around the deep veins of the calf and thigh. This results in decreased venous stasis and increased venous blood velocity thereby reducing the risk for DVT. To compress the veins of the calf and thigh, sequential compression devices (SCD's) must exert large forces to penetrate the large muscles to reach the deep veins. These large forces often damage venous valves and lead to venous incompetence and stasis. Damage to venous valves prevents appropriate recirculation of venous blood and results in venous stasis. This promotes the formation of DVTs and subsequent PEE. Damage to the veins including deep veins may occur in either a post-traumatic or post-surgical state, however use of standard sequential compression devices which primarily work on the foot veins, calf veins, or thigh veins also result in venous valve damage subsequent venous valve incompetence and venous stasis, and as a result DVT and PE. Anatomic studies have demonstrated that a popliteal venous valve is identified at or just distal to the adductor hiatus where blood vessels and nerves emerge from underneath the adductor muscle group. The adductor hiatus is located superior to the popliteal fossa, within the posterior aspect of the distal thigh. Embodiments of the DVT prevention device reduce a patient's risk of developing a DVT by increasing peripheral and central venous velocity and promoting efficient return of venous blood to the heart.

When compared to standard sequential compression devices (SCDS), embodiments of the DVT prevention devices and associated methods described herein offers many potential advantages. First, the device is lightweight, battery powered and does not require a large power source or large pneumatic force generating device. This enables the device to be portable and allows patients to ambulate while wearing the device. This also enables the device to be used comfortably outside of a hospital setting. Second, whereas standard sequential compression devices attempt to overcome musculature resistance and the depth of deep venous structures in the calf and thigh by increasing the force required to compress venous structures; Embodiments of the device and method described herein exploits anatomic knowledge to intermittently close the popliteal vein. Intermittent compression of the popliteal vein is favorable over deep venous structures of the calf and thigh, because as mentioned above, the popliteal vein is a superficial structure that requires a much lesser force to intermittently compress. Additionally, as mentioned above, because the anatomic location of popliteal venous valves are just distal to the adductor hiatus, the device does not damage venous valves. Also, because the popliteal vein is the main venous conduit in between the veins of the calf and deep veins of the thigh, intermittent compression of the popliteal vein also results in buildup of back pressure within the calf veins which results in indirect drainage of calf and foot veins per the venturi effect.

Third, whereas standard sequential compression devices function by generating graded compression forces or generating intermittent force on deep veins, embodiments of the current device function by simultaneously using two different mechanisms to increase peripheral and central venous blood flow. In various embodiments, this can be achieved through the use of a particular pressure or inflation cycle for inflating and applying pressure from the balloon or other expansion device to the applanator and in turn to the treated area of back of the patient's knee or other selected treatment area, e.g., the arm or other area of the leg. In particular embodiments the pressure or inflation cycle comprises a unique complex intermittent compression, hold, and relaxation cycle which is also known as a compression regimen. In contrast, traditional sequential compression devices generate graded compression forces. According to one or more embodiments, the cycle can be tuned or otherwise adjusted to each patient's unique physiology (e.g., their hemodynamic parameters, history of DVT etc.) so as to optimize increase in venous flow rates and velocities in the region of the patient's leg or other appendage treated by the DVT device.

One embodiment of the pressure cycle/compression regimen comprises the following. First, variable intermittent compression of the popliteal vein is achieved by an inflatable balloon that intermittently inflates and deflates. This balloon acts on an applanator to apply force on the popliteal vein through the skin. The applanator distributes the full force of the balloon onto the popliteal vein instead of the surrounding tissues, which results in sustained elevation of common femoral vein velocity.

Second, at the end of the variable intermittent compression period, the device keeps the popliteal vein closed for a variable amount of time and generates back pressure within the veins of the foot and calf. When the device relaxes and the popliteal vein is opened, the back pressure results in forced ejection of blood from the foot, calf, and popliteal vein. This results in a second mechanism in which peripheral and central venous blood velocity is also increased. This in turn, results in elevated venous blood flow rates for about 5 to 60 minutes after the device has been turned off suggesting that the combination of both intermittent compression and the generation are highly efficacious in creating increase venous circulation in the region compressed by the device.

Embodiments of the device are simple to use in that it is easily fit over the knee just like an elastic knee band. It is also automated, and in many embodiments, it may have BLUETOOTH or other wireless connectivity that allows the user or physician to set the device parameters to a specific user's individual attributes including for example, the size of their knee and muscle tone (which affect the selected pressure) hemodynamic conditions, physical condition (e.g., bed ridden vs. ambulatory) and activity profile. Fifth, embodiments of the device can be used with the user in the supine, semi-recumbent (sitting with legs extended), sifting, or standing positions.

In a first aspect the invention provides a device for preventing deep vein thrombosis (DVT) in a patient comprising: a cuff configured to fit over the patient's leg and an applanator coupled to an inside surface of the cuff, an expandable member or other expansion device coupled to the applanator, a pressure source fluidically or otherwise coupled to the expansion device and a controller operatively coupled to the pressure source for controlling inflation of the expandable member. When the balloon or other expandable member is expanded, it applies a force to the applanator which is transmitted by the tissue contacting surface of the applanator as force/pressure to the surface of the leg which causes the deep vein to be flattened compressed so as to minimize blood flow through the deep vein. When the expandable member is deflated, the pressure applied from the applanator to the leg is ceased and the vein expands with resumption of blood flow. As is described herein, the expandable balloon is cyclically inflated and deflated according to a pressure cycle so as to augment blood flow through the compressed vein.

The cuff is desirably sufficiently elastic to be pulled over and positioned over a desired area of the user's leg such as the knee area. Accordingly, the cuff may comprise various elastomers known in the art such as silicone, polyurethane and the like. In additional or alternative embodiments, the cuff can be configured to be wrapped over and around the leg and then held in place by a fastening means such as VELCRO.

The applanator is configured to apply a force to outside surface of the leg such as that behind the knees so as to flatten or otherwise compress a selected vein to intermittently substantially stop blood flow through the leg. Thus as used herein, the term "applanator" means a device or structure for applying force from an external tissue surface of the body to flatten or otherwise compress a vein beneath the tissue surface, such as a deep vein. Embodiments of the applanator will typically have a tissue contacting surface having a curved or other shape configured to apply force (per unit area) to a surface of the leg sufficient to compress a deep vein in the leg such as the popliteal vein. The force may be in the range of about 0.5 to ten pounds with specific embodiments of 1, 2, 3, 5, 6, 7, 8 and 9 pounds. Accordingly, the applanator may be fabricated from various materials having sufficient rigidity to apply desired amount of force. Suitable materials include various thermoset polymers as well as rigid metals. Typically, the tissue contacting surface of the applanator will have a semi-circular shape so as to concentrate force on the center or other area of the leg containing the selected deep vein. In the case of the popliteal vein, the applanator diameter may be about one to three times the diameter of the popliteal vein to ensure that the vein is compressed. In related embodiments, the diameter of the tissue contacting surface may also correspond to approximately the distance between the two major tendons on either side of the popliteal vein. In various embodiments, the applanator may be custom fit to an individual patient (e.g., based on these or other measurements depending upon the area to be treated). Such a custom fit may be achieved, for example, by custom fabrication using various methods known in the polymer and machining arts including one or more of molding, CMC machining and 3D printing methods. Also, the applanator is desirably positioned on the cuff to be centered over the selected deep vein to be compressed. In this case of the popliteal vein, this corresponds to the center of the back of the knee.

In various embodiments, the applanator will typically include a base portion having a rectangular or square shape and the curved tissue contacting portion which is attached or integral to the base portion. As described above, the tissue contacting portion will typically have a semi circular or other convex shape with the convex portion making contact with tissue. In many embodiments, the base portion of the applanator is attached to a hinge plate which is either directly or indirectly attached to the cuff. The hinge plate includes a hinge element on one side which engages a corresponding hinge element on the applicator allowing the applanator to pivot up into tissue when the balloon or other expandable member is inflated. The base portion of the hinge may have an indented portion in its center area which has a contour approximating at least a portion of that of the balloon so as to hold the balloon in place when the balloon is inflated. Also, desirably as described below with respect to the support structure, the hinge plate has sufficient rigidity such that it does not appreciable deform upon inflation of the balloon and mechanically perform in similar way as to the support structure to prevent expansion of the cuff and direct the balloon inflation forces to the applanator and in turn to the underlying tissue to be compressed by the applanator.

According to one or more embodiments, the DVT device may also include a support structure attached to the cuff and positioned between the cuff and the hinge plate. The support structure is mechanically structured, e.g. in terms of its shape and rigidity to direct force generated by the balloon or other expansion device inward onto the applanator rather than have it be dissipated by causing expansion of the cuff. Desirably, the support structure is made of sufficiently rigid materials such as thermoset plastic which not deform when the balloon is inflated.

In particular embodiments, the support structure may comprise a flat surface or comprise two portions: an indented portion and a larger flat portion which surrounds the indented flat portion. Similar to the hinge plate, the indented portion may have a contour corresponding to at least a portion of that of the inflated balloon so to partially hold the balloon when the balloon is inflated. The larger flat portion serves to distribute the forces from the balloon expansion of a larger area of the cuff so as to reduce the pressure on the cuff and thus the amount of cuff expansion resulting from balloon inflation. This in turn reduces the dissipation of the forces from balloon expansion by having them cause expansion of the cuff or release of the VELCRO fastening portions on the cuff. In turn, this results in a greater amount of the force of balloon expansion being transferred to the applanator and in turn to the tissue surface to cause compression/flattening of selected deep vein beneath the applanator such as the popliteal vein. Such embodiments are particularly useful for embodiments of an elastic cuff or those where the cuff uses VELCRO fastening portions which may become unfastened by the application of force from the expanding balloon. Also desirably, the support structure flat portion has a larger surface area than the overlying hinge plate so as to provide further mechanical opposition to the forces from the balloon expansion tending to cause cuff expansion as well distribute those forces over a larger area of the cuff thus reducing the amount and likelihood of cuff expansion.

The expansion device will typically correspond to various expandable balloons or other expandable members known in the medical device arts including the balloon catheter arts. According to various embodiments, the expandable balloon may be fabricated from one of various expandable balloon materials known in the medical arts including for example, silicone, polyurethane, and copolymers thereof. In preferred embodiments, the expandable balloon or other expandable member is made of relatively non-compliant materials such as PET, polyethylene (e.g., HDPE), radiated polyethylene and other polymers and copolymers thereof such that the balloon is able hold a fixed expanded shape and apply force to the applanator rather than continue to expand outward beyond its inflated shape. In alternative or additional embodiments, the expansion device may comprise an electric-mechanically based expanded device including for example, a piezoelectric material-based device, a solenoid, an electric motor or the like. For embodiments using an electro-mechanically based device, a pressure source is not required merely an electric power source such as portable batteries known in art for example, alkaline or lithium ion batteries.

The pressure source will typically correspond to a pump such as a pneumatic pump or mechanical pump which is selected and configured to generate sufficient pressure for the expandable member so as to apply sufficient compressive force from the applanator to a target tissue surface to flatten/compress a selected deep vein beneath the tissue surface as described herein. The generated pressure may be in the range of about 0.5 to 20 atms, with specific embodiments of 2, 5, 7, 10 and 15 atms. In various embodiments, the pressure source may correspond to a pneumatic or mechanical pump. In alternative or additional embodiments, the pressure source may correspond to a compressed gas source containing compressed air or an inert gas.

According to one or more embodiments, the pressure source may be connected directly to the balloon or expandable member. In additional or alternative embodiments, they may be indirectly connected by means of a valve fluidically coupled to at least one of the pressure source or the expandable member. The valve is configured and positioned so as to control the pressure released from the pressure source to the balloon or other expandable member. Typically, the valve will an external valve positioned between the pressure source and the expandable member but may be positioned in other locations as well relative to these elements. In other embodiments, the valve may be integral to either the pressure source or the balloon or both.

The valve may correspond to one or more control valves known in the art including various electronically controlled valves including, for example, a solenoid valve. For the latter embodiments, the valve may operatively coupled to the controller such that the control is able to send and receive signals to open the valve according to specific time sequences and/or based on pressure measurements. In the latter embodiments, the device can also include a pressure sensor fluidically coupled to one or more of the pressure source and/or the expandable member and operatively coupled to the controller so as send signals corresponding to measured pressure to the controller. The pressure sensor may correspond to various electronic and/or solid state pressure sensors known in the art.

The controller is configured to control inflation of the expandable balloon or other expandable member by controlling one more of the pressure source and/or embodiments of the control valve described herein. According to various embodiments, the controller is configured to control inflation of the expandable member so as to produce a selected pressure cycle and/or compression regimen described herein. In many embodiments, this can be achieved through the use of a module (typically a software module) which contains an algorithmic set of electronic instructions for preforming these tasks. The controller will typically correspond to a microprocessor, which may be off the shelf or incorporated into an ASIC. In other cases, the controller may correspond to a hardware device which may correspond to various analogue devices including various state devices.

In many embodiments the DVT prevention device will also include an internal power source for powering one more of the controller, pressure source or electronic device or component included in the DVT prevention device. Suitable power sources include various electrochemical storage batteries, such as alkaline, lithium or lithium ion batteries, with other battery chemistries also contemplated. The use of rechargeable batteries is also contemplated. In these and related embodiments, the device may be configured to be plugged into an external electric power source for powering the device as well as recharging the batteries. In various embodiments, the external power may comprise a wall socket or a USB source with other power sources contemplated. In use, embodiments employing an external power source allows conservation of battery power as well as means of recharging the batteries vs replacing them. For embodiments using a battery power source, the use of circuitry and/or algorithms for detecting and alerting the user to the state of battery charge is also contemplated.

In many embodiments, the DVT prevention device will also include a transmitter for wireless communication with an external device (e.g., a cell phone), a network or the cloud. Typically, the transmitter will comprise a miniature RF transmitter and will be operatively coupled to at least controller. The RF or other transmitter is further configured to send and receive signals from an external device such as cell phone, tablet device or other like device so as to allow the DVT device including the controller to wirelessly communicate with theses external devices. The RF transmitter can be connected or integral to the controller. Typically, the transmitter and/or controller will be configured to communicate via a BLUETOOTH protocol but other wireless protocols known in the art are also contemplated. For BLUETOOTH embodiments, the transponder may comprise a BLUETOOTH transponder known in the art. In use, such wireless communication ability allows the user or physician to do one or more of the following: 1) custom program the DVT device for an individual user (e.g., to include a particular pressure cycle); 2) receive data on device performance (e.g. # of pressure cycles implemented, pressure generated, compression hold times, battery life data and the like); 3) share the data with others (e.g., medical practitioners) over the cloud or other network; and 4) reprogram the device as needed depending upon the date or change in the patient's or mobility status. For example, in the latter case, the device can be specifically programed with a unique compression regimen for long trips on an airplane where the user will be seated for extended periods of time (e.g. 3 to 14 hours).

In alternative or additional embodiments, the DVT prevention device may also include one more of push buttons and the like, a display and an audio alarm, one or more of which may be coupled to the controller. The push buttons can be configured to allow the user to do the following: 1) turn the device on and/off; 2) select or adjust a compression regimen and/or pressure cycle; and 3) select or adjust pressure levels. The display can display various information including the pressure level being used, information on a pressure cycle (e.g., graph of pressure vs time, the particular cycle/pressure regimen selected and/or being implemented and the time remaining in the cycle) and information on battery life. In various embodiments, the display can be a touch screen allowing the user to enter information and/or otherwise interact with the device to perform various functions such as those described for the push buttons. The audio alarm can be configured to alert the user to various events and/or information including, for example, the start or end of a pressure cycle, interruption of a pressure cycle, and alarms about an amount of battery charge and/or battery life. Still other information and events are also contemplated. In various embodiments, the controller can also be configured to send information on an alarm event to the external device and/or over the cloud which create an audio alarm on the external device and/or to medical practitioner monitoring over the cloud.

In a second aspect, the invention provides a system for preventing deep vein thrombosis (DVT) comprising an embodiment of the DVT prevention device described herein and an external device such as cell, table device or the like configured to communicate with DVT prevention device. In many embodiments, the external device and the DVT device will be configured to communicate with each other using a BLUETOOTH communication protocol and in such embodiments each device will include a BLUETOOTH transponder known in the art.

The external device will typically include a software module for displaying and/or wirelessly adjusting one or more parameters of the balloon inflation process including for example, set balloon inflation pressure, actual balloon inflation pressure, balloon inflation time, interval between inflations, and time remaining on a current balloon inflation or an inflation cycle described herein as well as related parameters and metrics. The display of the external device may also be configured to allow the user to select, display or wirelessly change such parameters used by the DVT device. Thus in use, the software module on the external device functions as a chimeric application allowing the patient or medical practitioner to wirelessly display and control various parameters and metrics of the DVT device.

In another aspect, the invention provides methods of preventing deep vein thrombosis and related pulmonary embolic events (PEE). In one embodiment, the method comprises placing an embodiment of the DVT prevention device described herein around a patient's limb such as the leg where there is risk of developing a DVT due to poor circulation. In particular embodiments, the device is placed around the patient's knee so to compressive one or more of the popliteal, femoral, common femoral or tibial vein. The device may be pulled over the knee or wrapped around the knee. Then, the balloon or other expansion device is expanded according to a pressure cycle or compression regimen. One embodiment of such a regimen or pressure cycle comprises a period of intermittent balloon inflation and resulting intermittent application of compressive forces to tissue under the leg, followed by a period of holding of the balloon inflation and constant applied compressive force and then deflation of the balloon and relaxation of the applied compressive force to the leg. The internment compressive force application period may, in some embodiments, correspond to a series of compressive pulses with periods of relaxation between them. The pulses may have selected durations for example in the range from 1 to 20 seconds with specific embodiment of 5, 10 and 15 seconds. Longer durations are also contemplated. The cycle, including compressive pulses, compressive hold and relaxation period can be repeated multiple times over a selected time period. As shown in the examples section, use of such pressure cycles resulted in an average increase in peak blood velocity in the common femoral vein of between about 388 to 506% depending on whether the subject was sitting with their knee bent or in a recombinant position. The largest increases can be obtained after the pressure hold period. After completion of the cycle, the baseline peak velocities remained elevated for periods from 5 to 60 minutes, with two particular individual base line levels staying elevated for 15 and 60 minutes respectively, thus demonstrating the long-term effect of the cycle in maintaining elevated levels of venous circulation in the tissue region or the leg or other limb compressed by the applanator.

In various embodiments, the parameters of the pressure cycle including one or more of balloon inflation pressure, pulse duration, duration between pulses and hold time and pressure can be selected and/or adjusted for an individual patient using ultrasonic imaging and blood velocity measurement approaches described in the examples section. Further, these parameters may be adjusted by the patient or physician in response to changes in one or more of the patient's physical condition, activity level or medications (e.g. anti-coagulants or blood pressure medication) using embodiments of the external device described herein. They may also be adjusted for when the patient is expected to have long periods of sitting with limited mobility such as during a plane flight or train ride.

In other aspects of the invention, embodiments of the DVT prevention device can be used to increase venous blood velocity and flow so as produce one or more physiologic benefits in addition to DVT and associated PE prevention. Such benefits may include, for example, increased venous return, increased cardiac output or reduced lactic acid buildup (e.g., in a leg, arm or tissue site compressed by an embodiment of the DVT prevention device). In particular embodiments, the device and pressure regimen can be adapted to increase venous blood velocity and flow so as to increase venous return for patients suffering from venous insufficiency or related conditions. In other embodiments, the device and pressure regimen can be adapted to increase venous blood velocity and flow so as to increase cardiac output for patients suffering from one or more forms of heart failure in particular, left heart failure.

Embodiments of the DVT prevention device and regimen can also be configured to produce one or more of the above physiologic benefits so as to provide for improved exercise performance, for example by increasing cardiac output and/or reducing buildup of lactic acid and/or $CO_2$ levels in muscle being exercised. The improved exercise performance may include improved performance in running, swimming, weightlifting or other aerobic or anaerobic exercise. In particular embodiments, the pressure regimen can be adapted to produce amounts of increased venous velocity and blood flow tailored for improved performance in a selected exercise or activity, such as running or biking.

Further details of these and other embodiments of deep vein prevention devices, apparatus and systems are described more fully below with reference to the attached figures.

BRIEF DESCRIPTION OF THE DRAWINGS

FIG. 5*c* depicts a pressure pulse having a square wave shape while FIG. 5*d* depicts a pressure pulse having a sine wave shape.

DETAILED DESCRIPTION OF THE INVENTION

Figure 1:
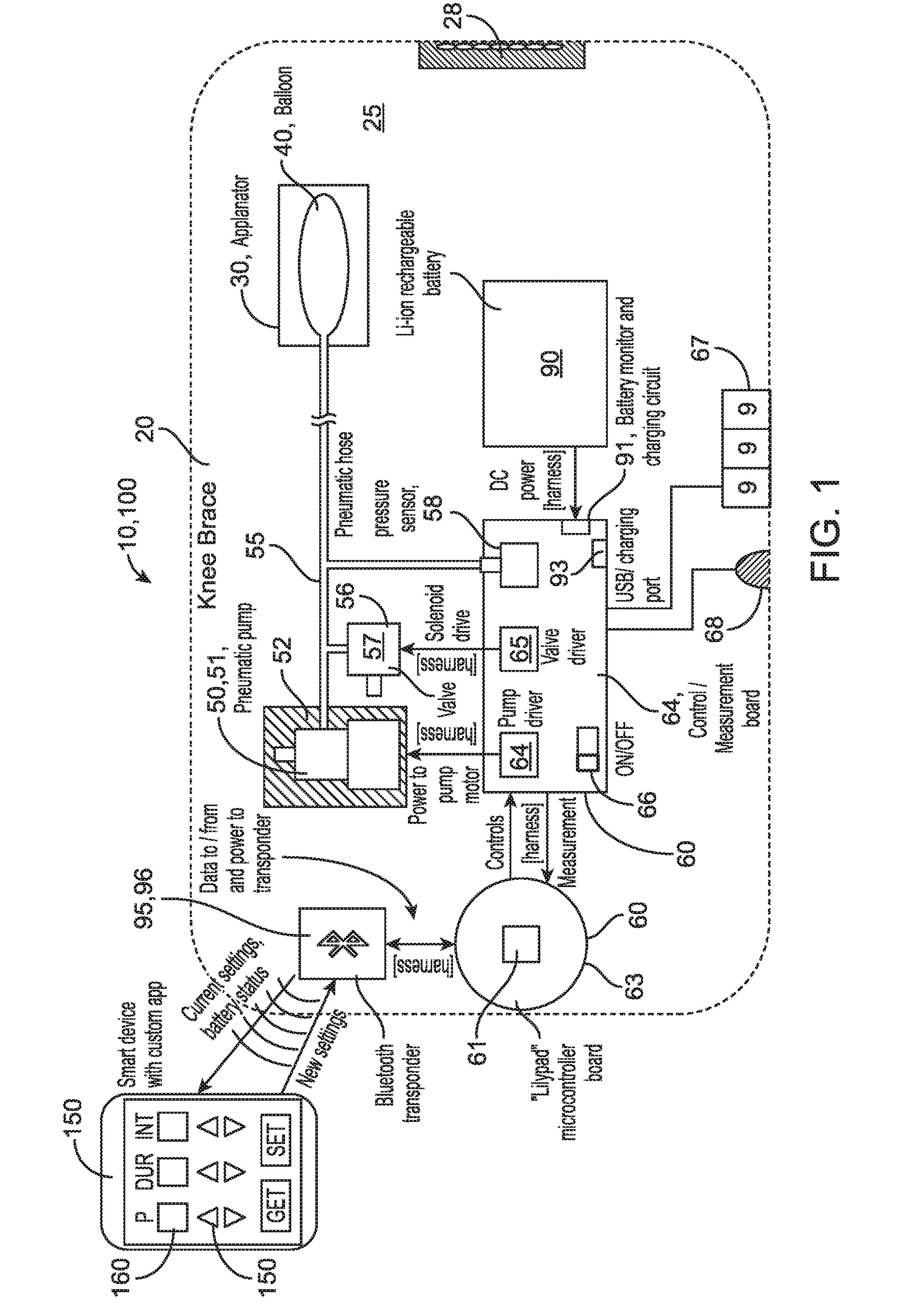
FIG. 1 is a schematic view illustrating an embodiment of the deep vein thrombosis prevention device and system.
Figure 2:
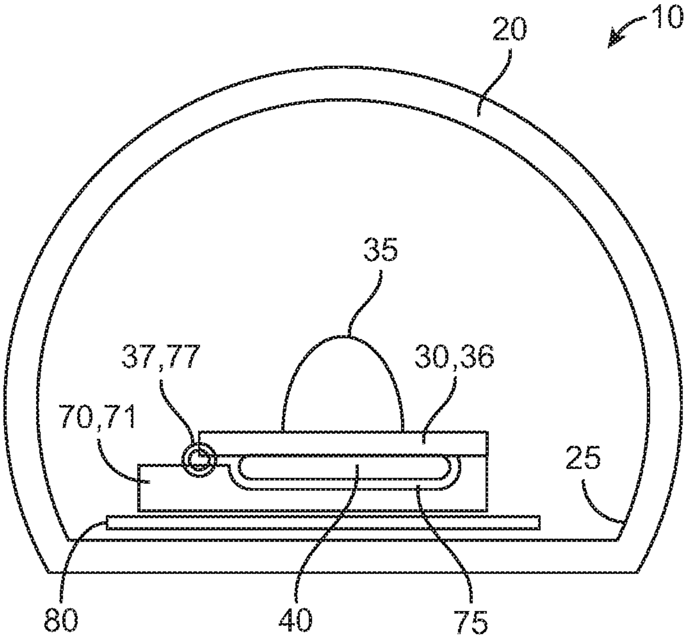
FIG. 2 is a cross sectional view of an embodiment of the deep vein thrombosis prevention device.

Various embodiments of the invention provide devices, systems and methods for the prevention of deep vein thrombosis (DVT) in the appendages such as the arms and the legs. Many embodiments provide devices, systems and methods for prevention of deep vein thrombosis (DVT) in the veins of the leg including for example the femoral, popliteal or tibial veins. Particular embodiments provide a DVT prevention (DVTP) device configured to fit over the knee of a patient so as to prevent DVTs in one or more of the distal common femoral vein, popliteal vein, posterior tibial vein, anterior tibial vein and peroneal vein. With regard to nomenclature, as used herein the term "prevent" (and related terms prevention or preventing) means one or more of the following: reduce the likelihood of the occurrence of a medical condition or event (e.g., deep vein thrombosis), reduce the number of occurrences of a medical condition or event, reduce a severity of a medical condition or event; or reduce the duration of a medical condition or event. Such medical conditions or events may include without limitation, vascular thrombosis, venous thrombosis and deep vein thrombosis and related conditions or events such as an embolism, pulmonary embolism and cerebral embolism, ischemia and edema. Also, the term "about" means within 10% of a stated value including those for a measurement, characteristic, parameter or property and more preferably within 5% of such a stated value. Similarly, the term "substantially" means with 10% of a stated property, condition, or state, and more preferably within 5% of a such a property, condition or state.

Referring now to FIGS. 1-6, an embodiment of a deep vein thrombosis prevention device 10 can comprise a cuff 20, an applanator 30, an expansion device 40 such as an expandable balloon or other expandable member, a pressure source 50 and a controller 60. The applanator 30 is typically coupled to an inside surface 25 of the cuff. The balloon or other expandable member 40 is positioned between applanator 30 and a hinge plate 71 described herein. The pressure source 50 is fluidically coupled to the expandable member 40.

Figure 4A:
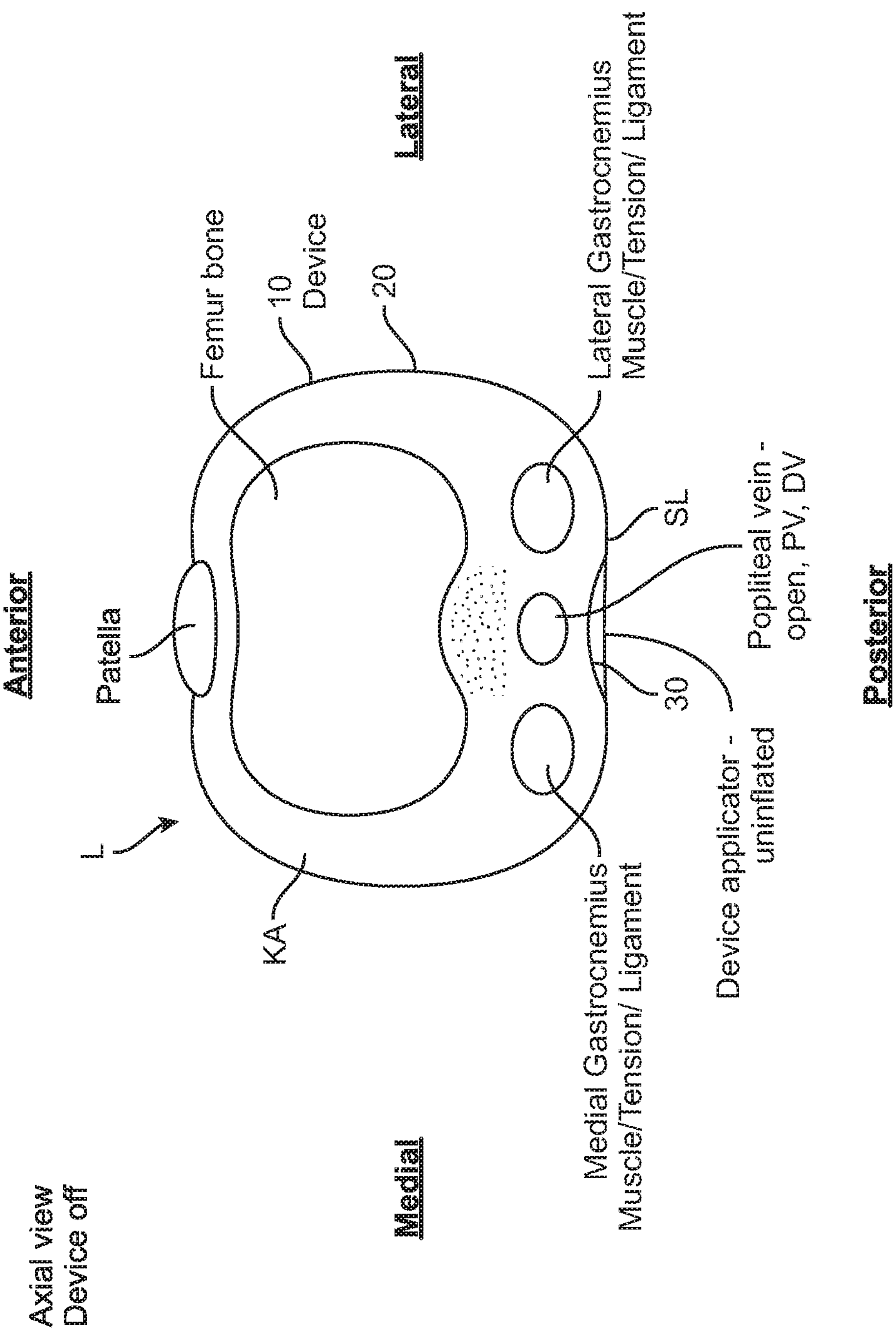
FIG. 4*a* is an axial view of the knee area with DVT prevention device positioned around the knee showing the device in the non deployed date.
Figure 4B:
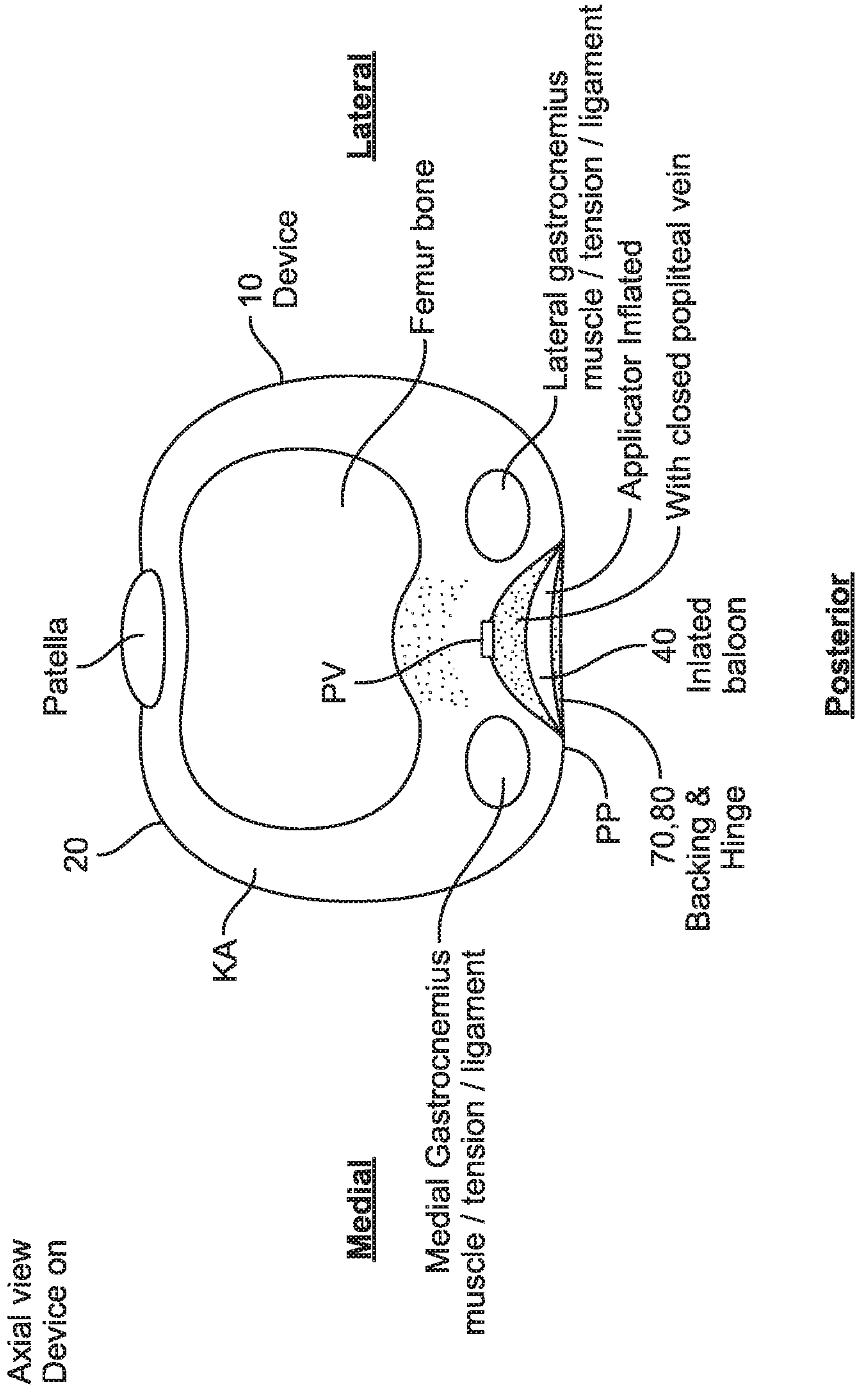
FIG. 4*b* is an axial view of the knee area with DVT prevention device positioned around the knee showing the device in the deployed date with applanator pressing against tissue to flatten/compress and close the popliteal vein.

FIGS. 4*a* and 4*b* are axial views illustrating use of the device 10 to compress the popliteal vein PV or other deep vein DV. The figures show the cuff wrapped around the knee area KA with the balloon in the inflated/non deployed date (FIG. 4*a*) and in the deployed state (FIG. 4*b*). When the balloon or other expandable member 40 is expanded, it applies a force to the applanator 30 which is transmitted by the tissue contacting surface 35 of the applanator as force/pressure to the surface of the leg (in this case posterior portion PP of the knee) which causes the deep vein DV such as the popliteal vein PV to be flattened or otherwise compressed so as to minimize blood flow through the deep vein DV. When the expandable balloon 40 is deflated, the pressure applied from the applanator to the leg is ceased and the vein expands with resumption of blood flow.

Cuff 20 is desirably sufficiently elastic to be pulled over and positioned over a desired area of the user's leg L such as the knee area KA. Accordingly, it may comprise various elastomers known in the polymer arts such as silicone, polyurethane and the like. In additional or alternative embodiments, the cuff 20 can be configured to be wrapped over and around the leg L (or other appendage such as the arm) and then held in place by a fastening means 28. In various embodiments, fastening means 28 may correspond to one or more of VELCRO, a clamp, a clip, a band, a strap or other fastener known in the art.

The applanator 30 is configured to apply a force to the outer surface of the leg such as that behind the knee (e.g., so as to flatten or otherwise compress a selected deep vein DV to as to interdentally substantially stop or reduce blood flow through the leg. Thus, as used herein, the term "applanator" means a device or structure for applying force to an external tissue surface of the body to flatten or otherwise compress a vein beneath the tissue surface, typically, a deep vein. Embodiments of the applanator 30 have a tissue contacting surface 35 having a curved or other shape 39 configured to apply force (per unit area) to a surface of the leg sufficient to compress a deep vein in the leg such as the popliteal vein. Typically, that shape 39 will be semicircular or other convex shape. The force may be in the range of about 0.5 to ten pounds with specific embodiments of 1, 2, 3, 5, 6, 7, 8 and 9 pounds. Accordingly, the applanator 30 will desirably be fabricated from material having sufficient rigidity to apply such a force. Suitable materials include various thermoset polymers known in the art as well as rigid metals. Typically, the tissue contacting surface 35 of the applanator will have a semi-circular shape so as to concentrate force on the center or other area of the leg containing the selected deep vein. In the case of the popliteal vein PV, the applanator diameter 38 is configured to concentrate force between the medial and lateral gastrocnemius muscle and tendons where the PV lies. Accordingly, in such embodiments the diameter 38 of the tissue contacting surface 35 may also correspond to approximately the distance between the lateral and medial gastrocnemius tendons/ligaments on either side of the popliteal vein or divisor thereof such as half, a third or quarter of that distance. In various embodiments, the applanator 30 may be custom fit to an individual patient (e.g., based on these or other measurements depending upon the area to be treated) and/or be custom fabricated using 3D printing methods. Also, the applanator 30 is desirably positioned on the cuff to be centered over the selected deep vein to be compressed. In the case of the popliteal vein, this corresponds approximately to center of the back of the knee.

Figure 3A:
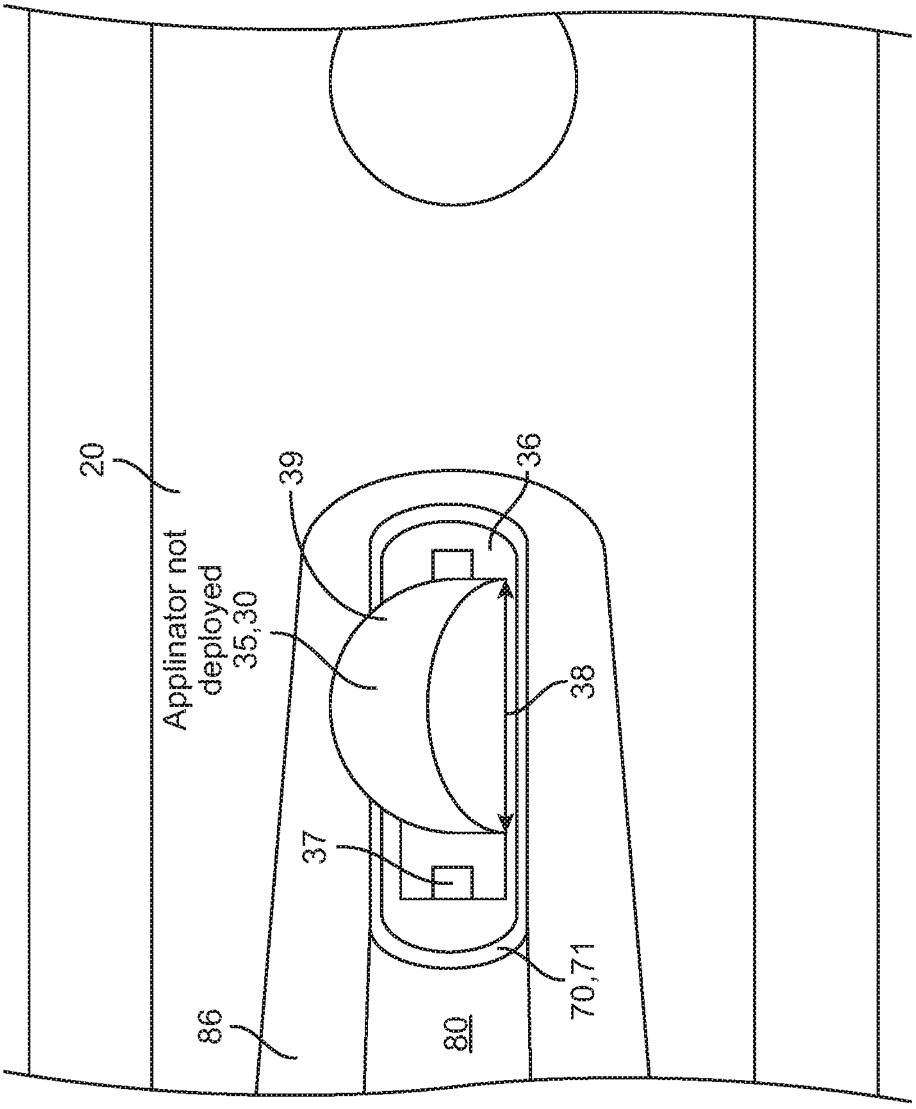
FIG. 3*a* is a perspective view of an embodiment of the deep vein thrombosis prevention device showing the applanator in a non deployed state.
Figure 3B:
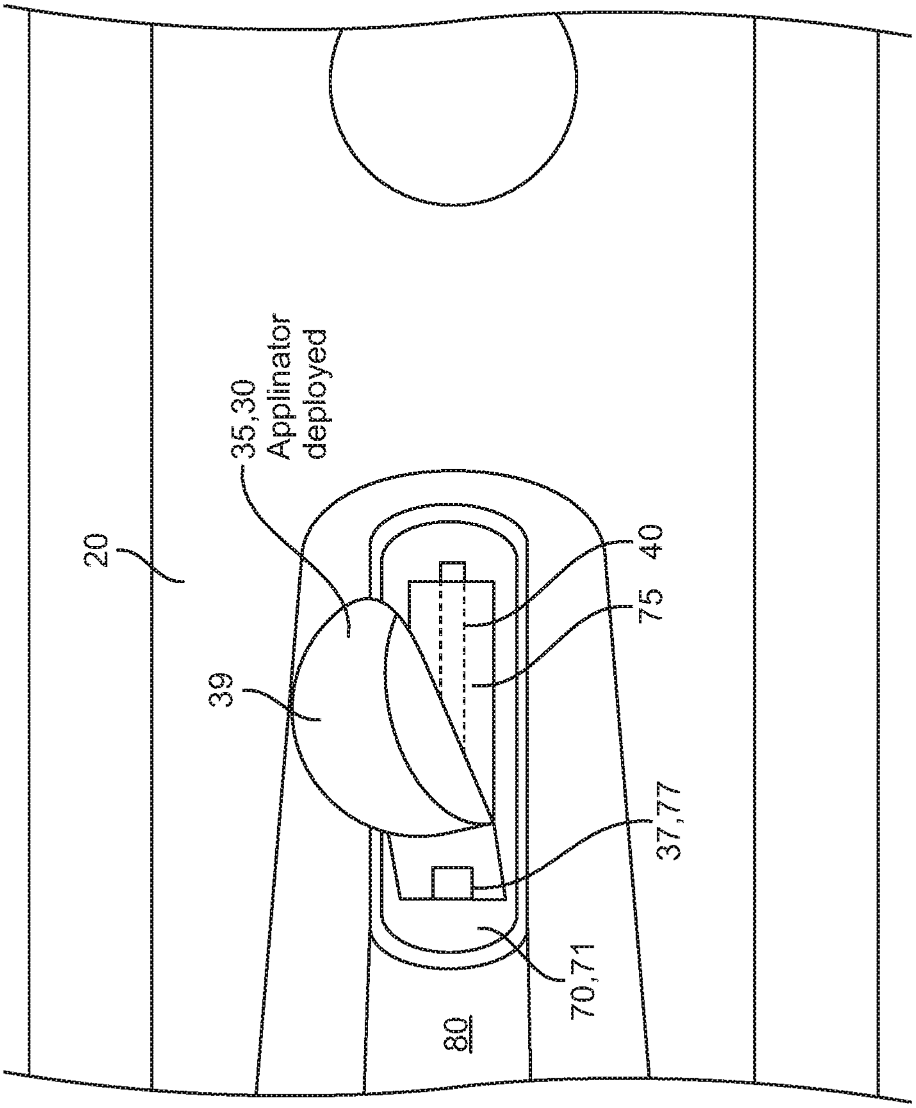
FIG. 3*b* is a perspective view of an embodiment of the deep vein thrombosis prevention device showing the applanator in the deployed state.

The applanator 30 will typically include a base portion 36 having a rectangular or square shape and the curved tissue contacting portion 35 which is attached or integral to the base portion. As described above, the tissue contacting portion 35 of applanator 30 will typically have a semi-circular or other convex shape with the convex portion making contact with tissue. In many embodiments, the base portion 36 of the applanator is attached to a hinge 70 including a hinge plate 71 (also known as a base portion 71) which is in either directly or indirectly attached to cuff 20. The hinge 70 also includes a hinge element 77 on one side of the plate 71 which engages a corresponding hinge element 37 on the applanator 30 allowing the applanator to pivot up into tissue when the balloon or other expandable member 40 is inflated, as shown in FIGS. 3A and 3B. The base portion 71 of the hinge 70 may have an indented portion 75 in its center area which has a contour approximating at least a portion of that of the balloon so as to hold the balloon 40 in place when the balloon is inflated. Also, desirably as described below with respect to the support structure, the hinge plate has sufficient rigidity such that it does not appreciable deform upon inflation of the balloon and mechanically perform in similar way as to the support structure to prevent expansion of cuff 20 and direct the balloon inflation forces to applanator 30 and in turn to the underlying tissue to be compressed by the applanator.

According to one or more embodiments, the DVT device 10 may also include a support structure 80 attached to cuff 20 and positioned between the cuff and the hinge plate 71 as is shown in FIGS. 3*a* and 3*b*. The support structure 80 is mechanically structured, e.g. in terms of its shape and rigidity to direct force generated by the balloon or other expansion device 40 inward onto the applanator 30 rather than have it be dissipated by causing expansion of the cuff 20. Desirably, the support structure 80 is made of sufficiently rigid materials such as thermoset plastic or metal which do not deform when the balloon is inflated.

In particular embodiments, the support structure 80 may comprise a flat surface or comprise two portions: an indented portion and a larger flat portion which surrounds the indented flat portion (which are not shown but which may generally correspond to the base 71 (e.g., a hinge plate) and contour portions 75 of hinge 70. Similar to the hinge plate, the indented portion may have a contour corresponding to at least a portion of that of the inflated balloon so as to partially hold the balloon when the balloon is inflated. The larger flat portion serves to distribute the forces from the balloon expansion of a larger area of the cuff so as to reduce the pressure on the cuff and thus the amount of cuff expansion resulting from balloon inflation. This in turn reduces the dissipation of the forces from balloon expansion by having them cause expansion of the cuff or release of the VELCRO fastening portions on the cuff. In turn, this results in a greater amount of the force of balloon expansion being transferred to the applanator 40 and in turn to the tissue surface to cause compression/flattening of selected deep vein beneath the applanator such as the popliteal vein. Such embodiments are particularly useful for embodiments of an elastic cuff or those where the cuff uses VELCRO fastening portions which may become unfastened by the application of force from the expanding balloon. Also desirably, the support structure flat portion has a larger surface area than the overlying hinge plate so as to provide further mechanical opposition to the forces from the balloon expansion tending to cause cuff expansion as well distribute those forces over a larger area of the cuff thus reducing the amount and likelihood of cuff expansion.

Expansion device 40 will typically correspond to various expandable balloons or other expandable members known in the medical device arts including the balloon catheter arts. For ease of discussion, expansion device 40 will now be referred to as either expandable member 40 or balloon 40. According to various embodiments, the expandable balloon 40 may be fabricated from one of various expandable balloon materials known in the medical arts including for example, silicone, polyurethane, and copolymers thereof. In preferred embodiments the expandable balloon or other expandable member is made of relatively non-compliant materials such as PET, polyethylene (e.g., HDPE), irradiated polyethylene (e.g., via ebeam technology) and other polymers and copolymers thereof such that the balloon is able hold a fixed expanded shape and apply force to the applanator rather than continue to expand outward beyond its inflated shape. In alternative or additional embodiments, the expansion device may comprise an electric-mechanically based expansion device including for example, a piezoelectric material-based device, a solenoid, an electric motor or the like. For embodiments using an electro-mechanically based device, a pressure source is not required merely an electric power source such as portable batteries known in art for example alkaline or lithium ion batteries.

The pressure source 50 will typically correspond to a pump 51 such as a pneumatic pump which can be fluidically connected to balloon 40 by means of pneumatic hose or tubing or connector 55. The pump is selected and configured to generate sufficient pressure for the expandable member to apply sufficient compressive force from the applanator to a target tissue surface flatten/compress a selected deep vein beneath the tissue surface as described herein. The generated pressure may be in the range of about 0.5 to 20 atms, with specific embodiments of 2, 5, 7, 10 and 15 atms. Higher ranges are also contemplated. In various embodiments, the pressure source may correspond to a pneumatic or mechanical pump. In alternative or additional embodiments, the pressure source 50 may correspond to a compressed gas source containing compressed air or an inert gas. In various embodiments, pump 51 (or other pressure source 50) and/or tubing or other connections 55 to balloon 40 may be acoustically insulated with acoustical insulation 52 or other otherwise acoustically dampened so that the inflation of balloon 40 or other expandable member 40 is relatively quiet and/or imperceptible to the user. One configuration of such acoustical insulation 52 positioned around pump 51 is shown in FIG. 1. In various embodiments, acoustical insulation 52 may correspond to open cell foam rubber, polymer fibers and polymer sealants (e.g., silicone). Acoustical damping may also be achieved through the use of acoustical insulation (e.g. foam) in cuff 20 which covers all or a portion of pump 51 and tubing 55. Other means of acoustical dampening of pump 51 and/or tubing 55 may include noise cancellation generators known in the art which may be controlled by controller 60. In various embodiments, device 10 can be configured such that loudness of the inflation of expandable 40 by pump 51 or other pressure source 50 is less than about 40 decibels; more preferably, less than about 30 decibels; still more preferably less than about 20 decibels and still more preferably less than about 10 decibels.

According to one or more embodiments, the pressure source 50 may be connected directly to the balloon 40 or other expandable member 40. Direct connection in this case may include any connector tubing 55. In additional or alternative embodiments, balloon or other expandable member 40 may be indirectly connected to the pressure source by means of a valve 56 fluidically coupled to at least one of the pressure source 50 or the expandable member 40. The valve 56 is configured and positioned so as to control the pressure released from the pressure source 50 to the balloon or other expandable member 40. Typically, the valve 56 will be positioned between the pressure source 50 and the expandable member 40 but may be positioned in other locations as well relative to these elements. In other embodiments, valve 56 may be integral to either the pressure source or the balloon or both.

In various embodiments, valve 56 may correspond to one or more control valves known in the art including various electronically controlled valves 57 including, for example, a solenoid valve. For the latter embodiments, the valve 56 may operatively coupled to the controller 60 such that the controller is able to send and receive signals so to open the valve according to specific time sequence and or based on pressure measurements. In the latter embodiments, the device 10 can also include a pressure sensor 58 that is fluidically coupled to one or more of the pressure source 50 and/or the expandable member 40 and operatively coupled to the controller 60 so as to send signals corresponding to measured pressure to the controller. The pressure sensor 58 may correspond to various electronic and or solid-state pressure sensors known in the art.

The controller 60 is configured to control inflation of the expandable balloon or other expandable member by controlling one more of the pressure source and/or embodiments of the control valve described herein. According to various embodiments, the controller is configured to control inflation of the expandable member 40 so as to produce a selected pressure cycle and/or compression regimen described herein. In many embodiments, this can be achieved through the use of a module 61 (typically a software module) which contains an algorithmic set of electronic instructions for preforming these tasks. Modules 61 may also include a pump drive module 64 and valve drive module 65 for controlling the generation of pressure and subsequent inflation of balloon 40. The controller 60 will typically correspond to a microprocessor, which may be off the shelf or incorporated into an ASIC. In other cases, the controller may correspond to a hardware device which may correspond to various analogue devices including various state devices. Combinations of microprocessor and analogue device based controllers are also contemplated. In particular embodiments, controller 60 may correspond to a first controller 63 and a second controller 64 for performing different functions. For example, controller 63 may handle communication between device 10 and external device 110 via transmitter 95 while second controller 64 performs various measurements and control function relating to the inflation of balloon 40 and control of a pressure cycle 200 as well as power management functions (e.g., battery monitoring). In a particular embodiment, controller 63 may correspond to a Lillypad microcontroller board while second controller 64 may correspond to an electronic board 64 containing one or more circuits or devices for control and measurement functions including, for example, control of valve 56, measurement of inflation pressure by sensor 58 and monitoring and control of the charging of battery 90 by battery monitoring and charging circuit 91. Board 64 may also include or be operatively coupled to a user accessible on-off switch or button 66.

In many embodiments, the DVT prevention device 10 will also include an internal power source 90 for powering one or more of the controller 60, pressure source 50 or other electronic device or component included in the DVT prevention device 10. Suitable power sources 90 include super capacitors and various electrochemical storage batteries, such as alkaline, lithium or lithium ion batteries, with other battery chemistries also contemplated. For battery powered embodiments the device 10 may include a battery monitoring circuit 91. The use of rechargeable batteries is also contemplated. In such embodiments, device 10 may include battery monitoring circuit may also comprise a battery charging circuit as well. In these and related embodiments, the device may be configured to be plugged into an external electric power source for powering the device as well as recharging the batteries. In various embodiments, the external power may comprise a wall socket or a USB source. In these embodiments device 10 may include a USB charging port or charging port 93. In use, embodiments employing an external power source allow conservation of battery power as well as providing a means of recharging the batteries vs replacing them. For embodiments using a battery power source, the use of circuitry and/or algorithms for detecting and alerting the user to the state of battery charge are also contemplated.

In many embodiments, the DVT prevention device 10 will also include a transmitter 95 for wireless communicating with an external device, a network or the cloud. Typically, the transmitter will comprise a miniature RF transmitter 95 and will be operatively coupled to at least controller. The RF other transmitter 96 is further configured to send and receive signals from an external device such as cell phone, tablet device or other like device so as to allow the DVT device including the controller to wirelessly communicate with theses external devices. The RF transmitter 95 can be connected or integral to the controller. Typically, the transmitter and/or controller will be configured to communicate via BLUETOOTH protocol but other wireless protocols known in the art area also contemplated. For BLUETOOTH embodiments, the transmitter 95 may comprise a BLUETOOTH transponder 96 known in the art. In use, such wireless communication ability allows the user or physician to do one more of the following: 1) custom program the DVT device for an individual user (e.g., a particular pressure cycle); 2) receive data on device performance (e.g. # of pressure cycles implemented, pressure generated, compression hold times, battery life data); 3) share the data with others (e.g., medical practitioners) over the cloud or other network; and 4) reprogram the device as needed depending upon the data or change in the patient's or mobility status. For example, in the latter case the device can be specifically programed with unique compression regimen for long trips on the airplane where the user will be seated for extended periods of time (e.g. 3 to 14 hours).

In alternative or additional embodiments, the DVT prevention device 10 may also include one or more of push buttons 66 and the like, a display 67 and audio alarm 68, one or more of which may be coupled to the controller 60 and in particular embodiments to controller 64. The push buttons 66 can be configured to allow the user to do one or more of the following: 1) turn the device on and/off; 2) select or adjust a compression regimen and/or pressure cycle; and 3) select or adjust pressure levels. The display 67 can display various information including the pressure level being used, information on a pressure cycle (e.g., graph of pressure vs time, the particular cycle/pressure regimen selected and/or being implemented and the time remaining in the cycle) and information on battery life. In various embodiments, the display 67 can be a touch screen allowing the user to enter information and/or otherwise interact with the device to perform various functions such as those described for the push buttons. The audio alarm 68 can be configured to alert the user to various events and/or information including for example, the start or end of a pressure cycle, interruption of a pressure cycle, and alarms about battery charge/battery life. Still other information and events are also contemplated for alert by alarm 68. In various embodiments, the controller can also be configured to send information on an alarm event to the external device and/or over the cloud which create an audio alarm on the external device and/or to medical practitioner monitoring over the cloud.

Various embodiments of the invention also provide a system 100 for preventing deep vein thrombosis (DVT) comprising an embodiment of the DVT prevention device 10 described herein and an external device 150 such as cell, table device or the like configured to communicate with DVT prevention device as is show in FIG. 1. In many embodiments, the external device 100 and the DVT device 10 will be configured to communicate with each other using a BLUETOOTH communication protocol and in such embodiments each device will include a BLUETOOTH transponder known in the art. Typically, device 150 will have a display 160 and may also have one or more buttons or switches or other user activated actuators 155.

The external device 150 will typically include a software module (not shown) for displaying and/or wirelessly adjusting one or more parameters of the balloon inflation process including for example, set balloon inflation pressure, actual balloon inflation pressure, balloon inflation time, interval between inflations, and time remaining on a current balloon inflation or an inflation cycle described herein as well as related parameters and metrics. This can be accomplished by means of buttons or switches 155 which may be real or virtual (e.g., acccessable through display 160). The display 160 of the external device 150 may also be configured to allow the user to select, display or wirelessly change one or more of the above or other parameters used by the DVT device. Thus in use, the software module on the external device 150 functions as a chimeric application allowing the patient or medical practitioner to wirelessly display and control various parameters and metrics of the DVT device.

Various methods of using embodiments of the deep vein prevention device 10 for preventing deep vein thrombosis and related embolic events such as pulmonary embolic events (PEE) will now be described. In one embodiment, the method comprises placing an embodiment of the DVT prevention device 10 described herein around a patient's limb such as the leg where there is risk of developing a DVT due to poor circulation. In particular embodiments, the device is placed around the patient's knee so as to compress one or more of the popliteal, femoral or tibial veins. The device may be pulled over the knee or wrapped around the knee. Then, the balloon or other expansion device is expanded according to a pressure cycle or compression regimen.

Figure 5B:
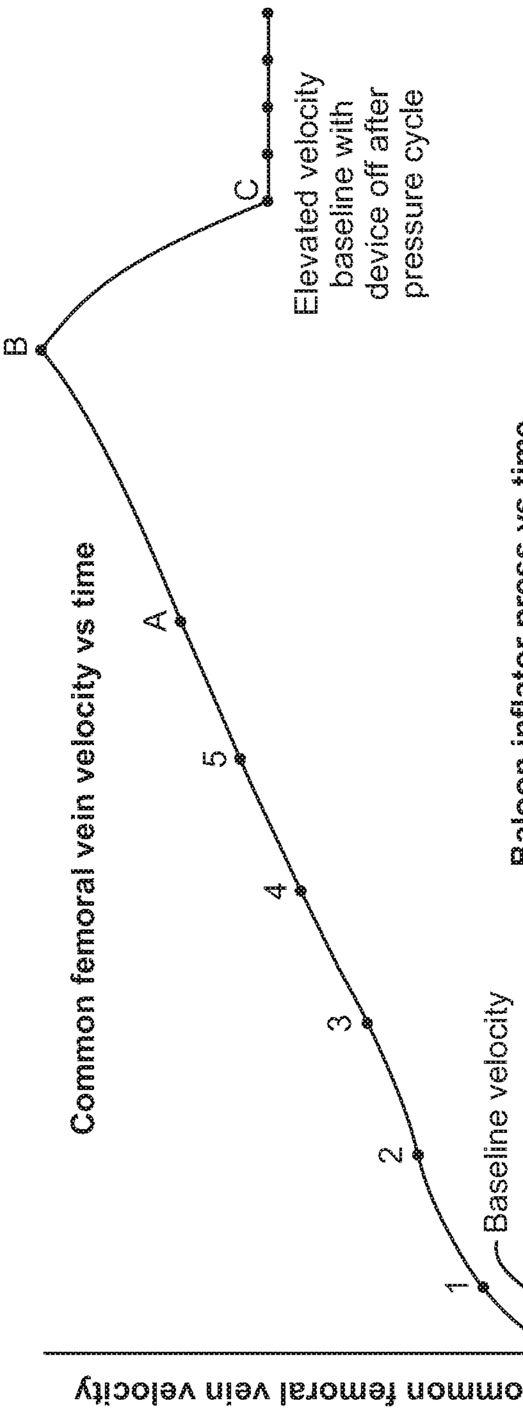
FIGS. 5*a* and 5*b* are value vs time graphs showing, in FIG. 5*a*, an embodiment of the pressure cycle; and in FIG. 5*b*, a generalized resulting increase in common femoral vein peak velocity.
Figure 5A:
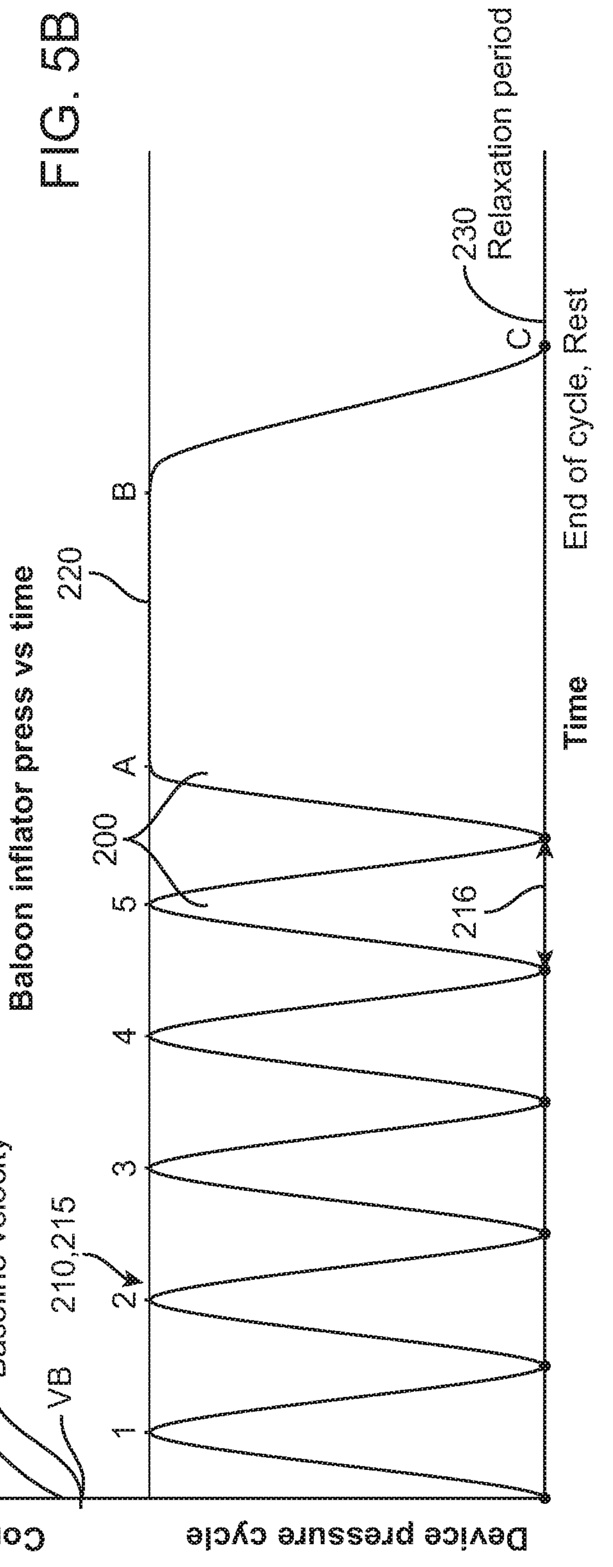
Figure 5C:
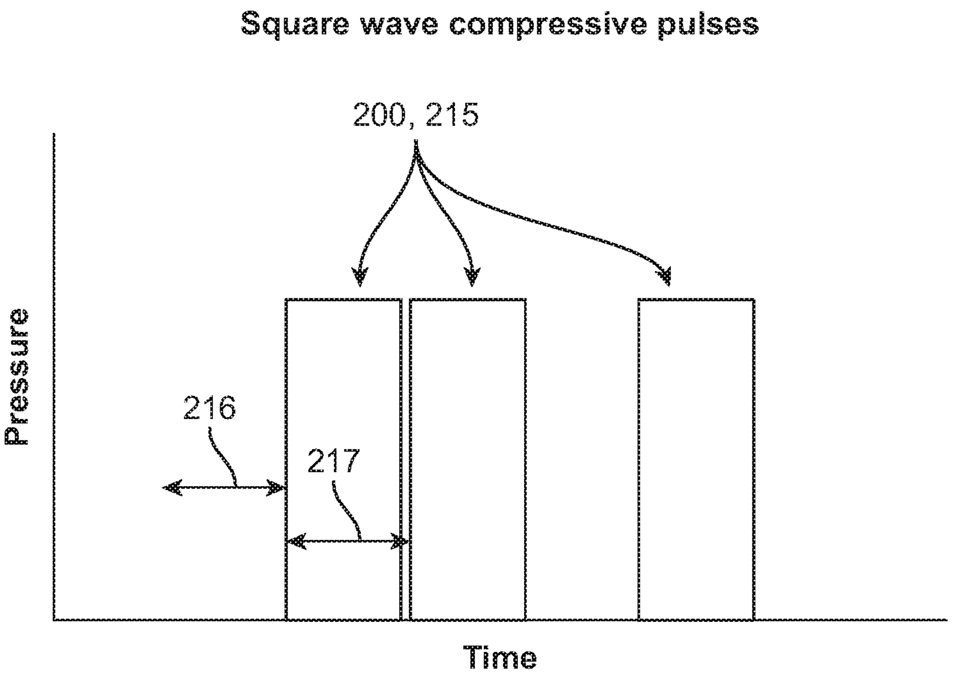
FIGS. 5*c* and 5*d* are pressure vs time graphs depicting different waveforms for the pressure pulses used in a pressure cycle.
Figure 5D:
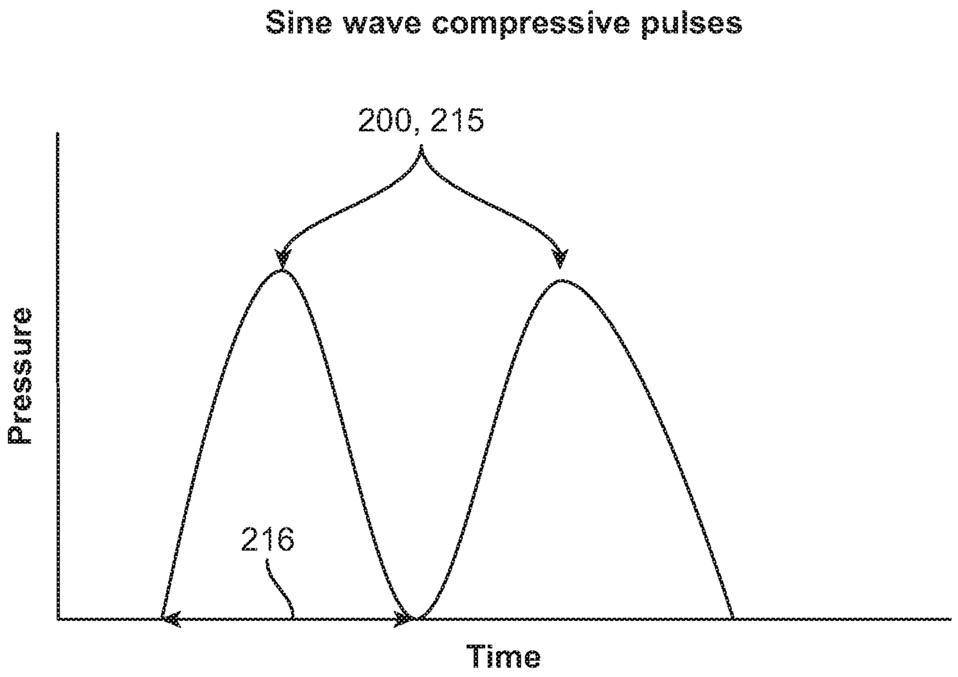
Figures 6A, 6B:
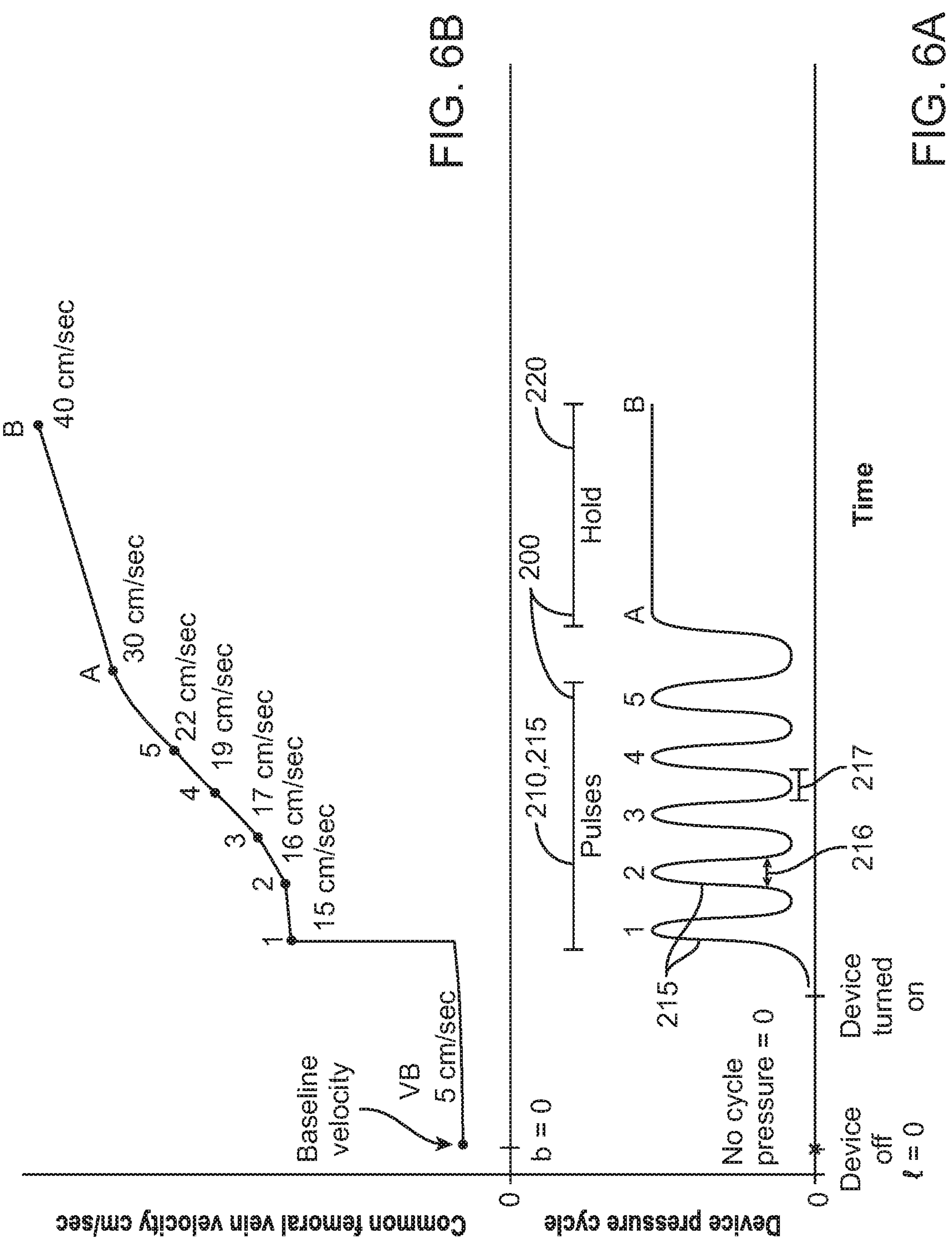
FIGS. 6*a* and 6*b* are value vs time graphs showing in FIG. 6*a* an embodiment of the pressure cycle and in FIG. 6*b*, the resulting increase in common femoral vein velocity for a particular individual whose common femoral vein velocity was measured.

One embodiment of such a pressure cycle or compression regimen 200 depicted in FIG. 5A, comprises periods 210 of intermittent balloon inflation and application of compressive forces to tissue under the leg (herein force application period 220), followed by a holding period 220 of balloon inflation and applied compression force (herein compressive hold period 220) and then a relaxation period 230 corresponding to balloon deflation and no or minimal compressive force as shown in FIGS. 5A and 6A. The internment inflation compressive force application period 210 may, in some embodiments, correspond to a series of compressive pulses 215 (corresponding to balloon inflation) with intervals of relaxation 217 (corresponding to balloon deflation) between them as is shown in FIGS. 5A, 5C, 5D and 6A. In the embodiments of pressure cycle 200 depicted in FIGS. 5A and 6A, sequential pressure pulses 215 are numbered 1, 2, 3, 4, 5 and the compressive hold period 220 is indicated by the horizontal line extending from the points A to point B. The corresponding increase in venous blood velocity (e.g., that of the common femoral vein) after each pressure pulse 215 is indicated by points, 1, 2, 3, 4 and 5 in FIGS. 5B and 6B. The corresponding increase from the compressive hold period 23 is shown in FIGS. 5B and 6B by the increase velocity going from points A to B. The end of the compressive hold period 230 is indicated by the point C in FIGS. 5A and 5B. The baseline venous blood velocity is indicated by point VB in FIGS. 5A and 5B. The increase in the venous velocity baseline after the completion of a pressure cycle 200 is also indicated by the point C in FIG. 5A.

In various embodiments, compressive pulses 215 (also described herein as pressure pulses or force pulses) may be in the form of square waves as shown in FIG. 5C or sine waves as shown in FIG. 5D with other shapes contemplated as well such as saw tooth. In additional or alternative embodiments, the pulse amplitude of pulse 215 can be sequentially increased (or decreased) in a selected manner (e.g., linear, geometric, first order, second order, etc.) so as to optimize the resulting increase in the blood velocity in the selected compressed vein(s). One or more of the timing, sequence, number, form (i.e., waveform) or other characteristic of compressive pulses 215 may be controlled by controller 60, for example, through use of pump drive module 64 and/or valve drive module 65 or other module 61.

Also, in additional or alternative embodiments, compressive pulses 215 may be synchronized or counter-synchronized to the user's heartbeat. Such embodiments can be implemented through a pulse detection means operably coupled to controller 60. Example pulse detection means may include without limitation pulse oximetry devices, acoustic sensing devices and EKG sensing devices known in the art.

The cycle 200 including compressive pulses 215, compressive hold period 220 and relaxation period 230 can be repeated multiple times (e.g. 2, 3, 4, 5 etc.) over a selected time period. As shown in FIGS. 5*b* and 6*b*, femoral blood velocity increases immediately above baseline with the first compressive pulse 215 and steadily increases with each subsequent compressive pulse 215 (e.g., pulse numbers 1, 2, 3, 4, 5 etc.) as well as continuing to increase after the hold period 220, reaching a new base line velocity at point C. In FIG. 6*b*, which depicts the venous blood velocity for an actual patient, the increase in blood velocity above baseline VB after the first pulse 215 was dramatic, nearly a three-fold increase and then continued with each subsequent compressive pulse resulting in a six-fold increase at the beginning of the hold period 230 (indicated by point A) and an eight fold increase at the end of the hold period (indicated by point B).

As shown in the examples section, use of such pressure cycles 200 on test subjects resulted in an average increase in peak blood velocity in the common femoral vein of between about 388 to 506% depending on whether the test subject was sitting with their knee bent or in a recombinant position with their knee straight. The largest increases were obtained after the pressure hold period 220. After completion of the cycle, the baseline peak velocities remained elevated for periods from 5 to 60 minutes, with two particular individual base line levels staying elevate for 15 and 60 minutes respectively, thus, demonstrating the long-term effect of a cycle 200 in maintaining elevated levels of venous circulation in the tissue region of the leg or other limb compressed by the applanator. Such long term increases in venous blood velocity result in the prevention of a DVT in the effected veins as wells as the prevention of pulmonary embolism caused by a DVT or related thrombotic event. In some embodiments, the cycle 200 may only include the series of compressive force pulses 215 with intervals of relaxation 217 between them. As shown in the examples section, such cycles resulted in increases in peak vein velocity in a range from 281 to 483%.

A discussion will now be presented of the values for the cycle parameters discussed above (e.g., pulse duration, etc.). In various embodiments, the number of compressive pulses 215 may be in the range of about 2 to 20 with specific embodiments of 4, 5, 10, 12, 15 and 20. In the embodiments described in the examples five pressure pulses were used and resulted in increases in peak vein velocity in range from 281 to 483%. An increased number of pulses may be used to obtain higher subsequent blood velocities. Also, pressure pulses 215 may have a selected duration 216, for example, in the range from about 1 to 20 seconds with specific embodiments of 5, 10 and 15 seconds. Longer durations are also contemplated. The interval of relaxation 217 between pulses can be in the range of about 1 to 20 seconds with specific embodiments of 5, 10 and 15 seconds. Longer durations are also contemplated. The compressive hold period 220 can be in a range from about 30 seconds to five minutes, with specific embodiments of 1, 2, 3 and 4 minutes, with even longer periods contemplated. As discussed herein, one or more of the above parameters can be adjusted for an individual patient depending upon one or more of their age, weight, prior history of deep vein thrombosis, anticoagulation treatment (e.g., type and amount of a given drug dosage such as ZARELTO, WARFARIN, etc.) and various hemodynamic parameters (e.g., average blood velocity for a selected vein, peak vein blood velocity, blood pressure and pulse). In particular embodiments, one or more of the above parameters can be using ultrasonic imaging and doppler blood velocity measurement approaches described in the examples section and/or known in the art. In this way, the patient is able to obtain an optimized or otherwise improved response in use of the device to increase venous blood velocity and flow in a treated area and in turn, reduce the risk of DVT. Further, these parameters may be adjusted by the user or physician in response to changes in one or more of the patient's physical condition, activity level or medications (e.g. anti-coagulants or blood pressure medication) using an embodiment of the external device described herein. In related embodiments, they may be adjusted based on a duration the patient expects to be in a sitting position with limited mobility (e.g., such as on an airplane flight, train ride, etc.) so as to prevent the occurrence of a DVT during that period.

In other aspects of the invention, embodiments of the DVT prevention device can be used to increase venous blood velocity and flow so as produce one or more other physiologic benefits. Such benefits (in addition to DVT and associated PE prevention) may include, for example, increased venous return, increased cardiac output or reduced lactic acid and/or $CO_2$ levels (in a leg, arm or other limb or tissue site compressed by embodiments of device 10). In particular embodiments, device 10 and pressure regimen 200 can be adapted to increase venous blood velocity and flow so as to increase venous return for patients suffering from venous insufficiency. In other embodiments, device 10 and pressure regimen 200 can be adapted to increase venous blood velocity and flow so as to increase cardiac output for patients suffering from one or more forms of heart failure in particular, left heart failure. Since under the Frank Starling Mechanism (known to those skilled in the cardiovascular physiology) increases in venous return result in equivalent or near equivalent increases in cardiac output (due to, inter alia, increases in ventricular fill volumes) embodiments of device 10 and the pressure regimen can be used to produce increases in cardiac output corresponding to the increase in venous blood flow produced by device 10 and a particular pressure cycle 200. In particular embodiments, cardiac output monitoring methods and instrumentation known in the art may be used to develop correlations between increased vein blood velocity and increases in cardiac output. These correlations may then be used to adjust the increase in vein blood velocity produced by a pressure cycle to yield a desired amount of increase in cardiac output.

In particular embodiments, a patient in need of increased cardiac output (e.g. those suffering from left ventricular heart failure) may use device 10 to undergo multiple pressure cycles over the course of a day to maintain their cardiac output at a desired level (e.g., 5 liters minute). They may do so by wearing device 10 continuously or may put on device at set intervals (e.g., once an hour, two hours etc.) in order to undergo a desired number of pressure cycle. They may also wear more than once device 10, e.g., one on each leg to produce an enhanced increase in venous return and resulting increase in cardiac output. This approach may also allow for a reduced number of pressure cycles to be performed over the day.

Embodiments of device 10 and regimen 200 can also be configured to produce one or more of the above physiologic benefits so as to provide for improved exercise performance, for example by increasing cardiac output and/or reducing build up of lactic acid and/or $CO_2$ levels in muscle being exercised. The improved exercise performance may include improved performance in running, swimming, weightlifting or other aerobic or anaerobic exercise. In particular embodiments, pressure regimen 200 can be adapted to produce amounts of increased venous velocity and blood flow tailored for improved performance in a selected exercise or activity, such as running or biking. Particular metrics of exercise performance such as $VO_2$max, and various blood gas measurements (e.g., PCO2, PO2, PH, and HCO3, etc.) can be used to tune or fine tune pressure cycle 200 so as to optimize or otherwise increase user performance in a given exercise (e.g., running, biking, swimming weightlifting, etc.) and at given intensity level and period of exercise (sprint vs longer distance). The optimized pressure cycle 200 for a given exercise and exercise duration can then be stored in memory on controller 60 (e.g., in form of a module 61) or memory resources coupled to the controller. In one or more methods for using device 10 to enhance performance in a given exercise, a user may put on one or more devices 10 (e.g., on a leg or arm), select a particular pressure cycle 200 and undergo one or more pressure cycles 10 at selected time period before a given exercise (e.g., running). In some embodiments, the user may wear device 10 and undergo one or more pressure cycles 200 while they are exercising so as to maintain enhanced venous blood while they are exercising. They may also keep device 10 on a selected time period after the exercise is completed or put it on afterwards so as to maintain the increased venous blood flow post exercise. In use, such embodiments serve to decrease the levels of metabolites in tissue post exercise which cause muscle soreness and fatigue. This in turn, reduces muscle recovery time from exercise in particular intense anaerobic exercise such as sprinting, weightlifting or prolonged aerobic exercise such as long distance running, biking swimming etc.

EXAMPLES

Various embodiments of the invention will now be further illustrated with reference to the following examples. However, it will be appreciated that these examples are presented for purposes of illustration and the invention is not to be limited by these specific examples or the details therein.

Experimental Design: To demonstrate that embodiments of the DVT device improved the efficiency of peripheral and central venous return and was on par with predicate devices, a brief study was performed to evaluate the amount of increase in peripheral and central venous velocity using an embodiment of the DVT prevention device. Five healthy adult volunteers without a history of DVT or Pulmonary Embolism were selected for the study.

Study Protocol: The study protocol was as follows. First, the superficial, deep, and common femoral vein was imaged with the volunteers in a sitting and semi-recumbent positions. In the semi recombinant position, the subject's knee was straight, their leg extended and their trunk was upright. In the sitting position, the subject's knee was bent. The baseline peak common femoral vein blood velocity was measured. Second, the popliteal vein was imaged and demonstrated to be compressible with the ultrasound probe to prove that there was no DVT within the popliteal vein at the time of the experiment. Third, the device was placed on the volunteer and under live ultrasound imaging, occlusion of the popliteal vein by the device was demonstrated. Fourth, the ultrasound probe was placed on the common femoral vein and peak common femoral vein blood velocity was measured during the device cycle. The device was allowed to then cycle though five compressive pulse periods followed by a holding period of compressive force as described above. Fifth, the device was turned off and after 5 minutes, peak common femoral vein blood velocity was measured using doppler ultrasound.

Results

The results of the study are shown in Tables 1 and 2 with the subject in a semi recombinant position with their knee straight (Table 1) or a sitting position with their knee bent (Table 2). The results for either position were dramatic and unexpected. For the straight knee semi-recumbent position, the device demonstrated an approximately 388% average increase in peak common femoral blood vein velocities (PCVV) after device pulsing and an approximately average 484% increase in peak common femoral blood vein velocities after the back pressure development phase of the cycle. For the bent knee sitting position, the device demonstrated an approximately average 387% augmentation in peak common femoral blood vein velocities (PCFVV) after device pulsing and an approximately a 506% average augmentation in peak common femoral blood vein velocities after the back pressure development phase of the cycle. Also, after completion of a cycle, the baseline PCFVV's remained elevated for extended periods of time e.g., from 15 to 60 minutes demonstrated the long term effect of the device and procedure in maintaining elevated velocities in the common femoral vein.

TABLE 1

Knee Straight, Volunteer in Semi-recumbent position

| | Baseline PCFVV-Straight Knee | PCFVV After Device Pulsing | PCFVV After Device Hold |
|---|---|---|---|
| Volunteer 1 | 5.6 cm/sec | .1 cm/sec | .5 cm/sec |
| Volunteer 2 | 5.3 cm/sec | 25.3 cm/sec | 28.2 cm/sec |
| Volunteer 3 | 6.9 cm/sec | 26.9 cm/sec | 36.2 cm/sec |
| Volunteer 4 | 5.7 cm/sec | 27.2 cm/sec | 36.1 cm/sec |
| Volunteer 5 | 9.6 cm/sec | 27 cm/sec | 34.1 cm/sec |
| Average | | 25.7 | 32.02 |

TABLE 2

Knee Bent, Volunteer Sitting

| | Baseline PCFVV-Bent Knee | PCFVV After Device Pulsing | PCFVV After Device Hold |
|---|---|---|---|
| Volunteer 1 | 5.2 cm/sec | 20.9 cm/sec | 30.1 cm/sec |
| Volunteer 2 | 4.9 cm/sec | 22.1 cm/sec | 29.2 cm/sec |
| Volunteer 3 | 6.7 cm/sec | 25.3 cm/sec | 34.2 cm/sec |
| Volunteer 4 | 5.4 cm/sec | 26.1 cm/sec | 32.1 cm/sec |
| Volunteer 5 | 9.1 cm/sec | 26.6 cm/sec | 32.9 cm/sec |
| Average | 6.26 | 24.2 | |

The foregoing description of various embodiments of the invention has been presented for purposes of illustration and description. It is not intended to limit the invention to the precise forms disclosed. Many modifications, variations and refinements will be apparent to practitioners skilled in the art. For example, various embodiments of the DVT prevention device can be adapted for appendages other than the legs including the arms. They may also be sized and otherwise adapted for various pediatric applications. Further, they may be adapted to allow the user sit, lie down or stand. Further still, they may be adapted to allow the user to be ambulatory. This includes engaging in various ambulatory activities including walking, running or biking and like actives. This also includes various exercises on devices which simulate one or more of these activities such as various elliptical exercise machines. In these and related embodiments, the cuff can be configured to have increased flexibility to allow the user to readily bend and flex their knee. Additionally, embodiments of the DVT prevention device can be used and/or adapted to increase venous blood so as produce one or more other physiologic benefits (in addition to DVT or PE prevention) including, for example, increased venous return, increased cardiac output, reduced lactic acid buildup and/or $CO_2$ levels in a leg, arm or other limb or tissue site so compressed by embodiments of the DVT prevention device 10. One or more of these benefits may be selected to improve the users performance in an exercise or activity such as walking, running, swimming or biking.

Elements, characteristics, or acts from one embodiment can be readily recombined or substituted with one or more elements, characteristics or acts from other embodiments to form numerous additional embodiments within the scope of the invention. Moreover, elements that are shown or described as being combined with other elements, can, in various embodiments, exist as standalone elements. Further, embodiments of the invention specifically contemplate the exclusion of an element, act, or characteristic, etc. when that element, act or characteristic is positively recited. Hence, the scope of the present invention is not limited to the specifics of the described embodiments, but is instead limited solely by the appended claims.

What is claimed is:

1. A device for preventing deep vein thrombosis (DVT) in a patient, the device comprising:

a cuff configured to fit over the patient's knee;

an applanator coupled to an inside surface of the cuff and located on the cuff so as to be positioned over a back surface of the knee when the cuff is pulled over the knee, the applanator comprising a rigid base and a tissue contacting surface projecting from a surface of the rigid base, wherein said tissue contacting surface has a curved shape and is sized and configured to apply pressure to a back surface of the knee to compress a popliteal vein in a back of the knee when a force is applied to the applanator without damaging a venous valve in the compressed popliteal vein, wherein a diameter of the tissue contacting surface corresponds to a distance between the medial and lateral gastrocnemius muscle behind the knee to concentrate force therebetween;

an expandable member coupled to the applanator for applying a force to the applanator;

a pressure source fluidically coupled to the expandable member and coupled to the cuff;

wherein when the expandable member is expanded it applies a first force to the surface of the rigid base of the applanator which has an area greater than a bottom area of the tissue contacting surface which projects from the base surface in order to increase a second force which is transmitted by the tissue contacting surface of the applanator to the back surface of the knee and causes the popliteal vein to be compressed so as to minimize blood flow through the popliteal vein without damaging a venous valve in the compressed popliteal vein; wherein the base portion comprises a hinge, and the base portion is configured to pivot relative to the hinge when the expandable member is inflating; and wherein the entire device is configured to be worn on the patient's knee and function while the patient is ambulatory.

2. The DVT prevention device of claim 1, wherein the cuff comprises an elastic or elastomeric material configured to stretch to fit over the patient's knee and then contract to hold the cuff in place.

3. The DVT prevention device of claim 1, wherein the cuff includes a fastener to allow the cuff to be wrapped around the patient's knee and then fastened to itself using the fastening means.

4. The DVT prevention device of claim 3, wherein the fastener comprise hooks and fasteners, the hooks positioned on a first portion of the cuff and the fasteners positioned on a second portion of the cuff.

5. The DVT prevention device of claim 1, wherein the expandable member is an expandable balloon.

6. The DVT prevention device of claim 1, wherein the pressure source is a pump, a pneumatic pump or a mechanical pump.

7. The DVT prevention device of claim 1, further comprising a pressure sensor fluidically coupled to at least one of the expandable member or the pressure source for measuring a pressure in the expandable member.

8. The DVT prevention device of claim 1, further comprising a valve fluidically coupled to the expandable member for maintaining and/or releasing pressure in the expandable member.

9. The DVT prevention device of claim 1, wherein the applanator is structured to be pivotally advanced against tissue of the back of the patient's knee when the expandable member is expanded.

10. The DVT prevention device of claim 1, wherein the curved surface of the applanator has a diameter in a range from about one to three times a diameter of the patient's popliteal vein.

11. The device of claim 1, wherein the tissue contacting surface has a convex shape relative to the rigid base.

12. The device of claim 1, wherein the tissue contacting surface has a semi-circular shape.

13. A method for preventing deep vein thrombosis (DVT) in a patient using the device of claim 1, the method comprising: applying force from the applanator comprising a rigid material to the back surface of the patient's knee to compress the popliteal vein in along the back surface of the knee so as to minimize blood flow through the popliteal vein without damaging a venous valve in the compressed popliteal vein, wherein the force is applied in a compression cycle comprising: i) a pulse period comprising a series of force pulses with intervals of relaxation between the pulses; ii) a hold period of constant force application; and iii) a relaxation period of minimal or no force application; and wherein completion of-the compression cycle causes a blood velocity within a deep vein of the patient's leg to remain elevated for an extended period of time by at least about twice the blood velocity in the deep vein of the leg prior to force application.

14. The method of claim 13, wherein the applanator applies 0.5 to ten pounds of force to the back surface of the knee.

15. The method of claim 13, where the applanator is positioned on an inside surface of a cuff, the method further comprising:

positioning the cuff over a portion of the patient's knee, such that the applanator is positioned over the back portion of the patient's knee to compress the popliteal vein.

16. The method of claim 13, wherein the pulse period is in a range from about 1 to 20 seconds.

17. The method of claim 9, wherein the relaxation period in each compression cycle is in a range from about 1 to 20 seconds.

18. The method of claim 13, where the hold period is in range from about one to five minutes.

19. The method of claim 13, where the series of force pulses comprises five pulses.

20. The method of claim 13, further comprising: repeating the compression cycle.

21. The method of claim 20, wherein the compression cycle is repeated at least twice.

22. The method of claim 13, wherein the extended period is at least about 15 minutes.

23. The method of claim 13, wherein the extended period is up to about an hour.

24. The method of claim 13, wherein the blood velocity is elevated in a range from about 484 to 506%.

25. The method of claim 13, wherein the blood velocity is elevated in a range from about 355 to 633%.

26. The method of claim 13, wherein the deep vein of the patient's leg is a femoral vein.

27. The method of claim 13, where a parameter of the pressure cycle is adjusted to optimize an increase in deep vein flow velocity for an individual patient.

28. The method of claim 27, wherein the parameter of the pressure cycle is at least one of a force pulse duration, duration between pulses or hold time.

29. The method of claim 27, wherein the force is applied by the applanator is generated by an expandable member coupled to the applanator and the parameter of the pressure cycle is an inflation pressure of the expandable member.

30. The method of claim 27, wherein the parameter of the pressure cycle is adjusted based on a patient hemodynamic parameter.

31. The method of claim 30, wherein the hemodynamic parameter is an average or peak blood velocity in a selected vein, blood pressure or pulse rate.

32. The method of claim 31, wherein the selected vein is a femoral vein.

33. The method of claim 27, wherein the parameter of the pressure cycle is adjusted based on a patient activity level.

* * * * *